United States Patent
Brock et al.

(10) Patent No.: US 12,422,050 B2
(45) Date of Patent: Sep. 23, 2025

(54) MULTI-WAY VALVE

(71) Applicant: Stant USA Corp., Connersville, IN (US)

(72) Inventors: Michael S. Brock, Connersville, IN (US); J Bradley Groom, Connersville, IN (US)

(73) Assignee: Stant USA Corp., Connersville, IN (US)

( * ) Notice: Subject to any disclaimer, the term of this patent is extended or adjusted under 35 U.S.C. 154(b) by 0 days.

(21) Appl. No.: 18/482,205

(22) Filed: Oct. 6, 2023

(65) Prior Publication Data

US 2024/0117888 A1 Apr. 11, 2024

Related U.S. Application Data

(60) Provisional application No. 63/414,205, filed on Oct. 7, 2022.

(51) Int. Cl.
*F16K 11/22* (2006.01)
*F16K 11/24* (2006.01)
*F01P 7/14* (2006.01)

(52) U.S. Cl.
CPC ............. *F16K 11/22* (2013.01); *F16K 11/24* (2013.01); *F01P 2007/146* (2013.01)

(58) Field of Classification Search
CPC .......... F16K 11/22; F16K 11/20; F16K 11/24; F16K 11/0743; F16K 11/074; F16K 11/085; F16K 11/0856; F16K 3/10; F01P 2007/146; F01P 7/14
See application file for complete search history.

(56) References Cited

U.S. PATENT DOCUMENTS

| | | | |
|---|---|---|---|
| 2,209,992 A * | 8/1940 | McGill | F16K 3/10 137/625.29 |
| 3,251,408 A | 5/1966 | Henry et al. | |
| 3,742,979 A * | 7/1973 | Woodling | F16K 11/074 251/192 |
| 3,927,693 A | 12/1975 | Johnston | |
| 4,429,717 A | 2/1984 | Montgomery | |
| 5,307,838 A * | 5/1994 | d'Agostino | F16K 11/074 137/865 |
| 5,431,189 A | 7/1995 | Jones | |
| 5,529,758 A | 6/1996 | Houston | |
| 6,245,233 B1 | 6/2001 | Lu | |

(Continued)

FOREIGN PATENT DOCUMENTS

| | | | | |
|---|---|---|---|---|
| CN | 204610957 U | * | 9/2015 | |
| CN | 106090315 A | * | 11/2016 | B60H 1/00642 |

(Continued)

OTHER PUBLICATIONS

Extended European Search Report, European Application No. 23201738.4-1015, dated Feb. 13, 2024 12 pages.

*Primary Examiner* — David Colon-Morales
(74) *Attorney, Agent, or Firm* — Barnes & Thornburg

(57) ABSTRACT

A multi-way valve adapted to control a flow of fluid to different thermal fluid circuits includes a valve housing, a valve flow controller, and a sealing system. The valve flow controller is arranged in the valve housing to control flow through the valve housing. The sealing system is configured to seal between the valve housing and the valve flow controller.

25 Claims, 17 Drawing Sheets

(56) References Cited

U.S. PATENT DOCUMENTS

| | | | |
|---|---|---|---|
| 6,347,644 B1 * | 2/2002 | Channell | F16K 11/20 137/625.29 |
| 6,371,060 B1 * | 4/2002 | Lehmann | F16K 11/074 123/41.1 |
| 7,819,948 B2 * | 10/2010 | Wagner | F16K 11/074 95/100 |
| 8,336,319 B2 | 12/2012 | Johnston et al. | |
| 8,375,990 B2 | 2/2013 | Veros | |
| 8,402,776 B2 | 3/2013 | Johnston et al. | |
| 8,448,696 B2 | 5/2013 | Johnston et al. | |
| 9,347,577 B2 * | 5/2016 | Peterson | F16K 31/0603 |
| 9,777,469 B2 | 10/2017 | Wang | |
| 10,344,877 B2 | 7/2019 | Roche et al. | |
| 10,665,908 B2 | 5/2020 | Krull et al. | |
| 10,851,901 B2 * | 12/2020 | Liberman | F16K 11/165 |
| 10,967,702 B2 | 4/2021 | Mancini et al. | |
| 11,084,404 B2 | 8/2021 | Gupta et al. | |
| 11,168,797 B2 | 11/2021 | Dragojlov et al. | |
| 11,175,265 B2 * | 11/2021 | Stearns | G01N 30/22 |
| 11,247,529 B2 | 2/2022 | Zhou et al. | |
| 11,383,578 B2 | 7/2022 | Huang et al. | |
| 12,110,973 B2 * | 10/2024 | Tiemeyer | F01P 7/165 |
| 2006/0118066 A1 | 6/2006 | Martins | |
| 2006/0231146 A1 | 10/2006 | Lillback | |
| 2008/0223464 A1 | 9/2008 | Merrell | |
| 2010/0319796 A1 | 12/2010 | Whitaker | |
| 2014/0053931 A1 | 2/2014 | Whitaker | |
| 2014/0090414 A1 | 4/2014 | Mclane et al. | |
| 2015/0354716 A1 | 12/2015 | Morein | |
| 2019/0039440 A1 | 2/2019 | Calderone | |
| 2020/0011437 A1 | 1/2020 | Lin et al. | |
| 2021/0331554 A1 | 10/2021 | Mancini et al. | |
| 2022/0146003 A1 | 5/2022 | Yu et al. | |

FOREIGN PATENT DOCUMENTS

| | | | | |
|---|---|---|---|---|
| CN | 107893865 A | | 4/2018 | |
| CN | 106090315 B | | 8/2018 | |
| CN | 112606676 A | | 4/2021 | |
| CN | 112682541 A | * | 4/2021 | |
| CN | 214743520 U | | 11/2021 | |
| CN | 214999563 U | | 12/2021 | |
| CN | 215059741 U | * | 12/2021 | |
| CN | 215950468 U | | 3/2022 | |
| CN | 114688306 A | | 7/2022 | |
| CN | 217207877 U | | 8/2022 | |
| CN | 217539713 U | | 10/2022 | |
| CN | 114635991 B | | 3/2023 | |
| CN | 221780053 U | | 9/2024 | |
| DE | 10153222 B4 | | 7/2012 | |
| DE | 102021101096 A1 | | 7/2022 | |
| FR | 2827356 A1 | * | 1/2003 | F16K 11/074 |
| GB | 2579183 A | * | 6/2020 | F16K 11/074 |
| WO | 2022057588 A1 | | 3/2022 | |
| WO | WO-2022258383 A1 | * | 12/2022 | F01P 7/14 |
| WO | WO-2022258388 A1 | * | 12/2022 | F16K 11/0743 |
| WO | WO-2022258399 A1 | * | 12/2022 | F01P 7/14 |

* cited by examiner

| MODE | LOOP 1 | LOOP 2 | LOOP 3 | BLOCKED |
|---|---|---|---|---|
| A | 6, 7 | 1, 2 | 5, 3 | 4 |
| B | 1, 2; 6-7-1RATIO CONTROL | | 5, 3 | 4 |
| C | 1, 7 | 1, 2 | 3, 5 | 4 |
| D | 6, 7 | 1, 4 | 2, 3 | 5 |
| E | ALL PORT CONNECT | | | |

*FIG. 7*

MULTI-WAY VALVE

PRIORITY CLAIM

This application claims priority to and the benefit of U.S. Provisional Patent Application No. 63/414,205, filed 7 Oct. 2022, the disclosure of which is now expressly incorporated herein by reference.

BACKGROUND

The present disclosure relates to multi-way valves, and particularly to multi-way valves for controlling the flow of heating and/or fluid to various thermal fluid circuits in a vehicle. More particularly, the present disclosure relates to an electro mechanical multi-way valve.

SUMMARY

A multi-way valve in accordance with the present disclosure includes a valve housing and a valve flow controller positioned in the housing to control the flow of fluid through the valve housing. The flow of heating and/or fluid is controlled to direct fluid to different thermal fluid circuits in a vehicle.

In the illustrative embodiments, the valve housing includes a lower housing body coupled to a manifold of the thermal fluid circuits, an upper housing body coupled to the lower housing body, and a housing cover. The upper housing body is shaped to define a first valve cavity and a second valve cavity in fluid communication with the first valve cavity through a basin defined by the lower housing body. The housing cover is coupled to the upper housing body to close top openings of the first and second valve cavities.

In the illustrative embodiment, the valve flow controller includes a first valve rotor arranged in the first valve cavity of the upper housing body and a second valve rotor arranged in the second valve cavity of the upper housing. The first valve rotor is configured to rotate relative to the upper housing body about a first rotor axis and the second valve rotor is configured to rotate relative to the upper housing body about a second rotor axis that is parallel to the first rotor axis. The first and second valve rotors cooperate to define a plurality of flow paths in the valve housing when the first and second valves are rotated about the respective rotor axes to control the flow of fluid through the upper housing body and the lower housing body.

In the illustrative embodiment, the valve flow controller of the multi-way valve further includes actuators each coupled to the respective valve rotors to control rotation of the valve rotors about the respective rotor axis. The actuators rotate the first and second valve rotor to different predetermined positions relative to the valve housing to establish different flow paths through the housing.

In the illustrative embodiment, the first valve rotor is formed to include a plurality of first rotor through holes that extend axially through the first valve rotor relative to the first rotor axis. The first rotor through holes extend axially through the first valve rotor so that the flow of fluid is able to flow axially through the first valve rotor parallel to the first rotor axis and into the valve housing. The first rotor through holes are spaced apart circumferentially around the first rotor axis and each align with one housing aperture formed in a floor of the upper valve housing in each of the different predetermined positions.

In the illustrative embodiment, the multi-way vale further includes a sealing system configured to form a seal engagement between the first valve rotor and the upper housing body of the valve housing. The sealing system includes a plurality of seals that are axially press-fit into the upper housing body around the apertures formed in the floor so that each of the seals engage an axially facing surface of the first valve rotor.

In the illustrative embodiment, the sealing system further includes a biasing assembly configured to apply an axial force on the first valve rotor when the first valve rotor is in preselected positions relative to the upper housing body. The biasing assembly selectively applies the axial force to the first valve rotor to urge the first valve rotor into a predetermined level of engagement with the seals when the first valve rotor is in one of the different preselected positions. This increased engagement of the first valve rotor with the seals improves sealing between the first valve rotor and the upper housing body and reduces leakage therebetween. This increased engagement of the first valve rotor with the seals applied only at preselected positions also reduces the amount of torque needed to rotate the first rotor between various positions and reduces wear on the seals themselves.

Additional features of the present disclosure will become apparent to those skilled in the art upon consideration of illustrative embodiments exemplifying the best mode of carrying out the disclosure as presently perceived.

BRIEF DESCRIPTIONS OF THE DRAWINGS

The detailed description particularly refers to the accompanying figures in which:

FIG. 1 is a perspective diagrammatic view of a multi-way valve configured to control the flow of fluid to various thermal fluid circuits in a vehicle;

FIG. 2 is an exploded view of the multi-way valve of FIG. 1 showing the multi-way valve includes a valve housing with a lower housing body, an upper housing body with first and second valve cavities, and a housing cover configured to be coupled to the upper housing body to close the first and second valve cavities and a valve flow controller including a first valve rotor—also referred to as a main valve rotor-configured to be arranged in the first valve cavity and a second valve rotor—also referred to as a throttle valve rotor-configured to be arranged in the second valve cavity, the first and second valve rotors configured to rotate about respective rotor axes to form a plurality of flow paths through the lower and upper housing bodies of the valve housing, and a sealing system configured to seal between the upper housing body and the main valve rotor as the main valve rotor rotates relative to the upper housing body;

FIG. 3 is a perspective view of the multi-way valve of FIG. 1 with the upper housing cover removed to show the main valve rotor arranged in the first valve cavity and the second valve rotor arranged in the second valve cavity, and further showing the main valve rotor is formed to define a plurality of first rotor through holes that each extend axially through the main valve rotor to open into one port formed in the upper housing body and the second valve rotor is formed to define second valve ports;

FIG. 4 is a cross-section view of the multi-way valve of FIG. 3 taken along line 4-4 showing the sealing system includes a press-fit seal that extends into the upper housing body to engage the main valve rotor to provide a seal between the main valve rotor and the upper housing body so that leaks between the main valve rotor and the upper housing body are reduced as fluid flows through the first rotor though hole, through the port in the upper housing body, and into a passage of the lower housing body;

FIG. 5 is a cross-section view of the multi-way valve of FIG. 3 taken along line 5-5 showing that a basin defined by the lower housing body forms a connecting passageway with end openings that align with one port in the upper housing body that opens into the first valve cavity and another port in the upper housing body that opens into the second valve cavity so that the first and second valve cavities are in fluid communication, and further showing the lower housing body has an inlet opening that opens into the connecting passageway between the first and second valve cavities;

FIG. 5A is a cross-section view of another embodiment of the multi-way valve of FIG. 5 showing the lower housing body and the upper housing body may be formed as a single piece component;

FIG. 6 is an exploded view of the upper housing body and the valve flow controller showing the main valve rotor includes a main valve rotor body having a main valve rotor hub, a main valve rotor plate that extends radially outward from the main valve rotor hub, and a first flow divider wall that extends axially away from the main valve rotor plate and around at least two first rotor through holes and a main valve rotor cover configured to be coupled to the first flow divider wall to block off the two first rotor through holes, and further showing the second valve rotor includes a second valve rotor plate formed to include a second rotor through hole that extends axially through the second valve rotor relative to the second rotor axis and a plurality of second valve rotor walls that extend axially away from the second valve rotor plate to define a plurality of second valve ports;

FIG. 7 is a table showing the different modes of the multi-way valve of FIG. 1 and the different flow paths created at each of the different modes A-E;

Figure 1:
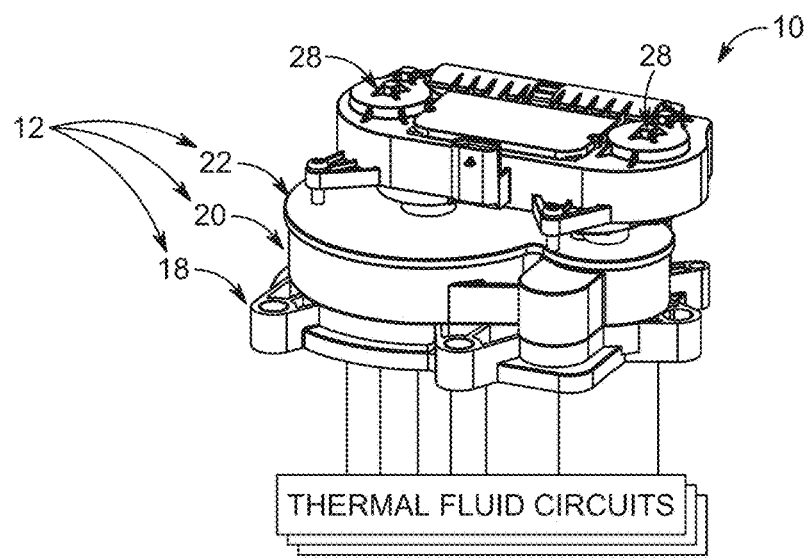
Figure 9:
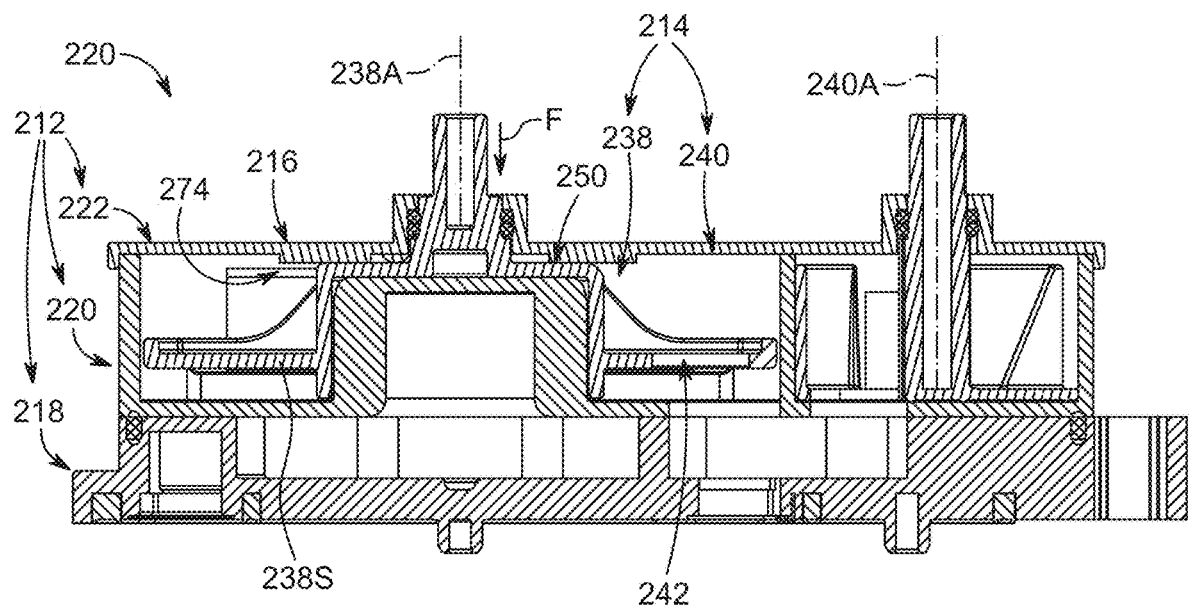
Figure 10:
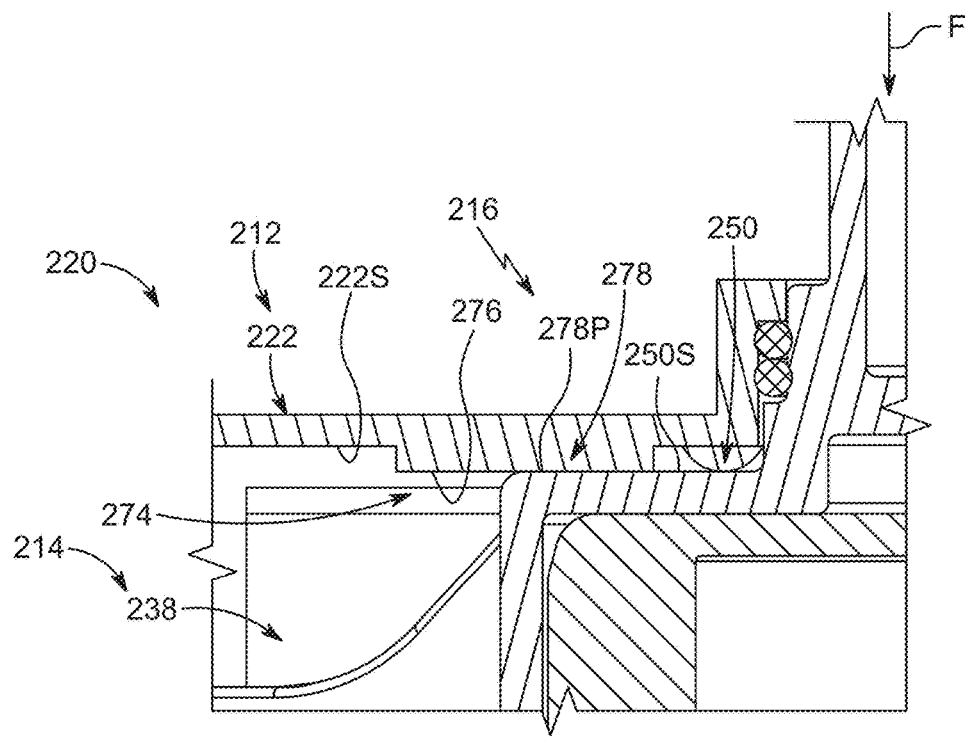
Figure 11:
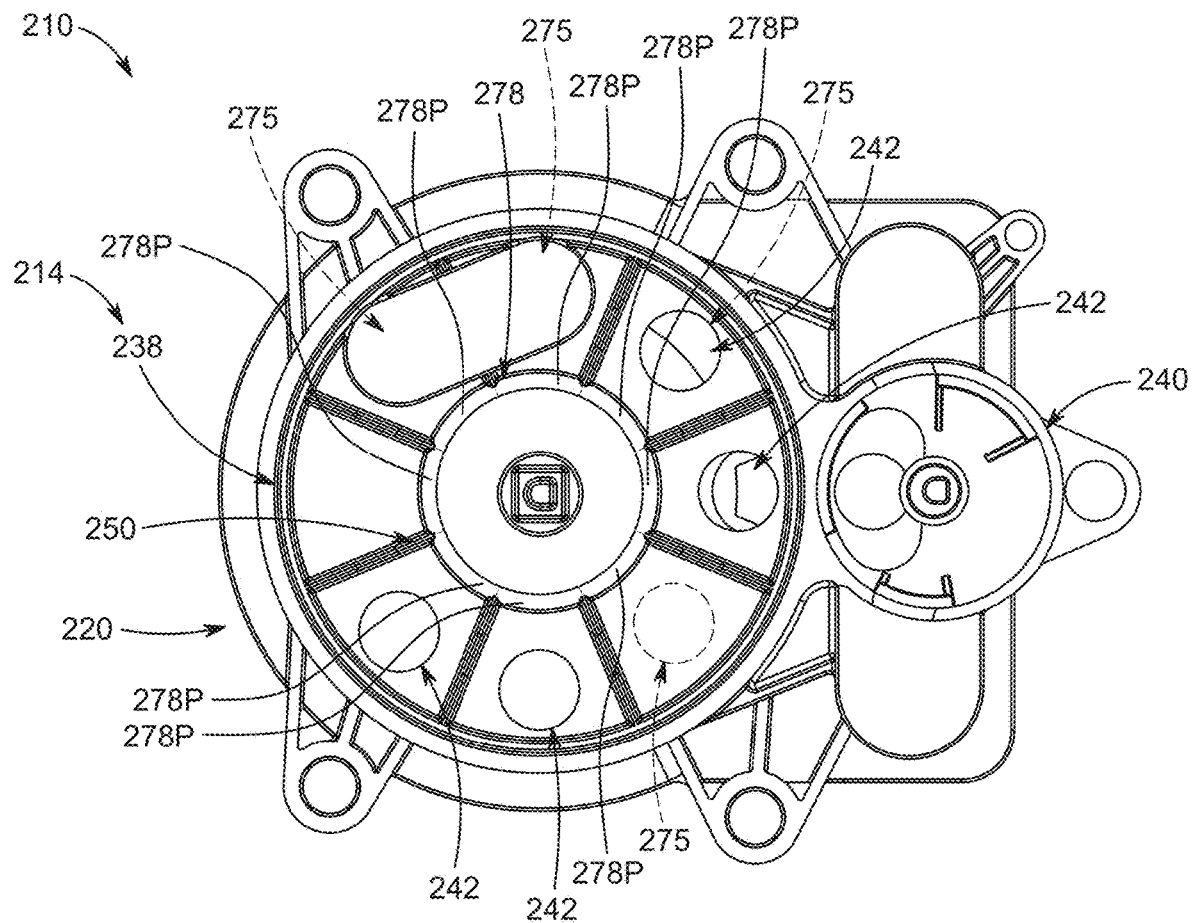
Figure 12:
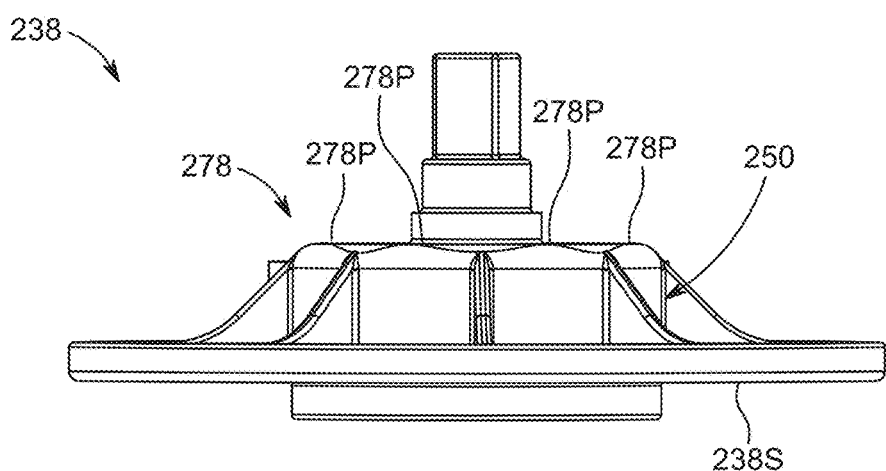
Figure 13:
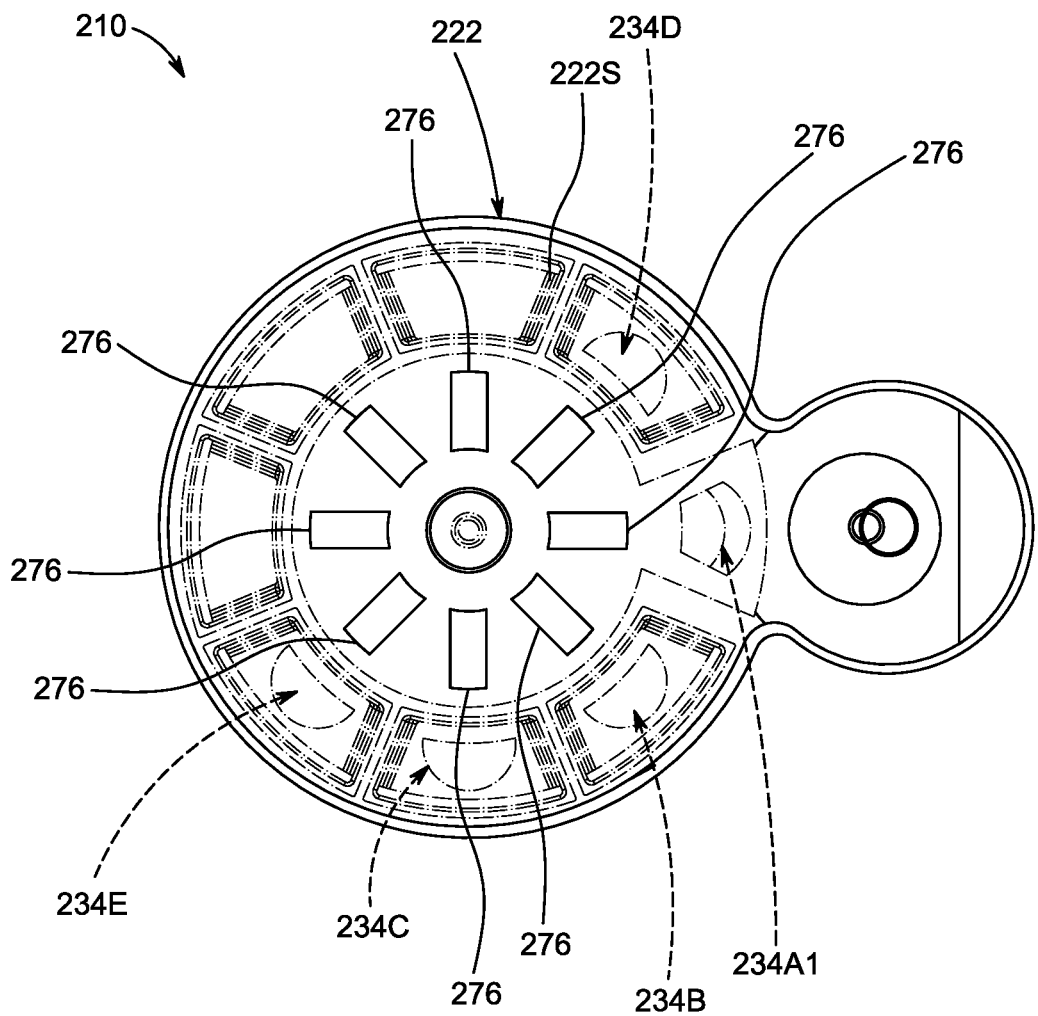
Figure 14:
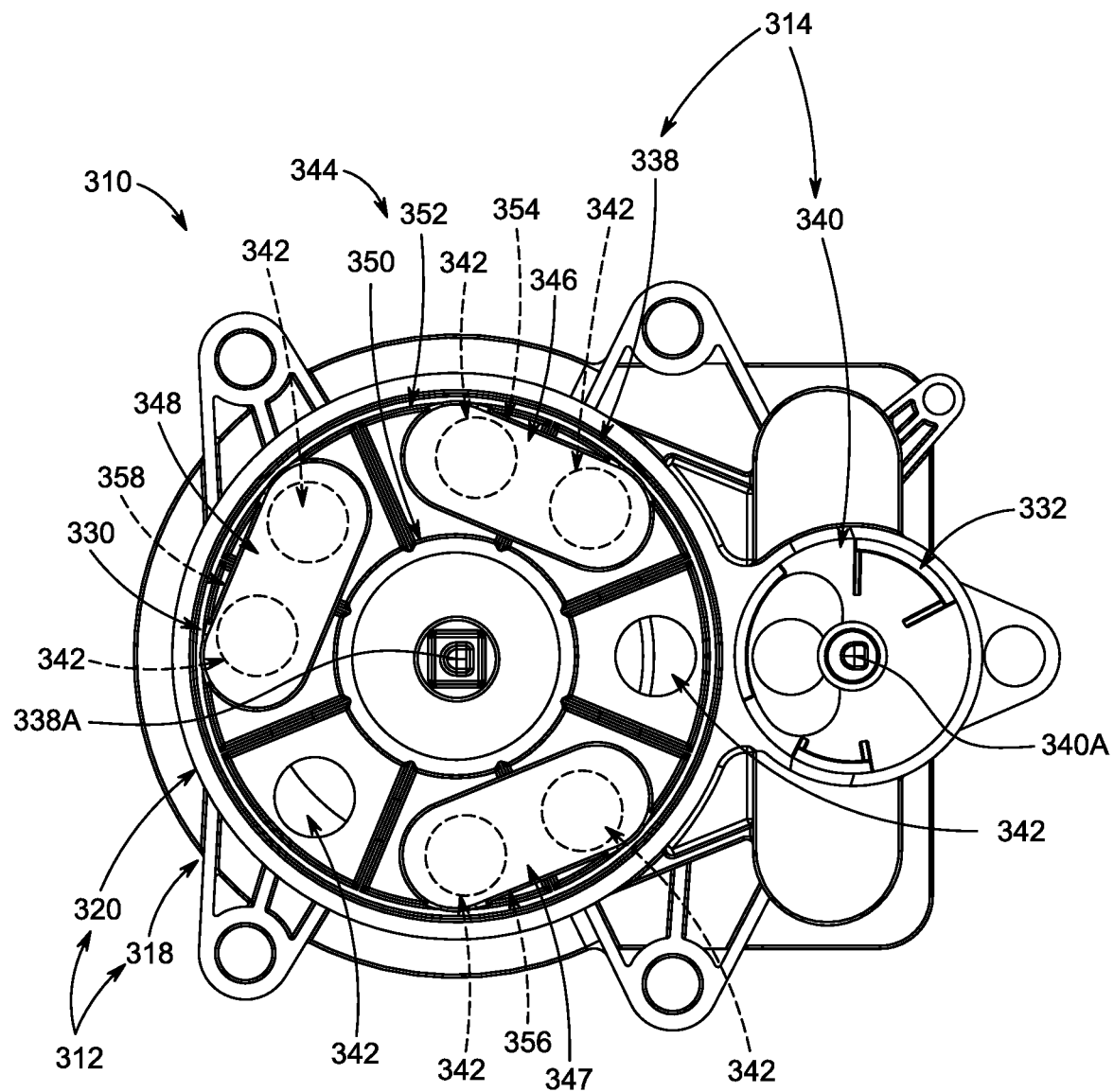
Figure 15:
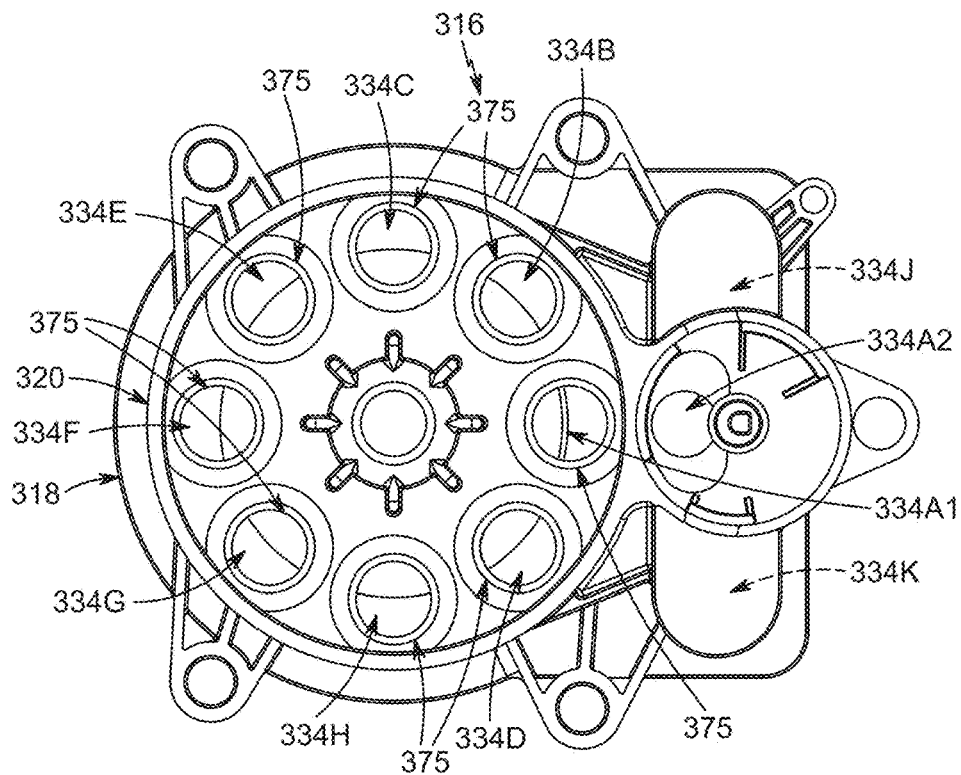
Figure 16:
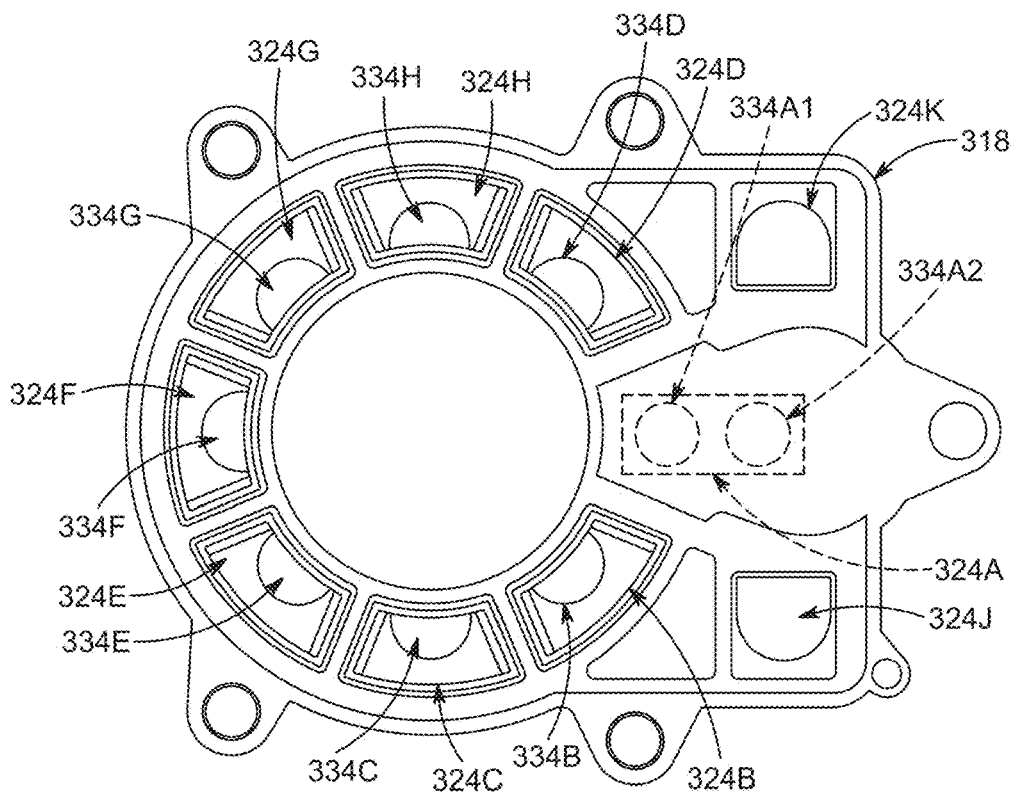

FIG. 9 is another embodiment of the multi-way valve of FIG. 1 showing the multi-way valve includes a valve housing, a valve flow controller including first and second valve rotors, and a sealing system that includes press-fit seals and a biasing assembly configured to selectively apply an axial force on the first valve rotor to urge the first valve rotor into engagement with the seals when the first valve rotor is in one of the different predetermined positions to improve sealing between the first valve rotor and the upper housing body;

FIG. 10 is a detail view of FIG. 9 showing the biasing assembly includes cam ramps formed on an axially facing surface of a housing cover of the valve housing and a cam surface formed on the first valve rotor that is configured to engage the cam ramps on the housing cover as the first valve rotor rotates about the first rotor axis to the different predetermined positions;

FIG. 11 is a top view of the multi-way valve of FIG. 9 showing the cam surface has raised portions that are spaced apart circumferentially about the first rotor axis at 45 degree intervals about the first rotor axis;

FIG. 12 is an elevation view of the first valve rotor included in the multi-way valve of FIG. 11 showing the raised portions of the cam surface extend axially away from an axially facing surface of the first valve rotor hub of the first valve rotor;

FIG. 13 is a top view of the housing cover included in the multi-way valve of FIG. 9 showing the cam ramps are equally spaced apart circumferentially about the first rotor axis and are each circumferentially aligned with one upper housing aperture formed in the upper housing body of the valve housing;

FIG. 14 is another embodiment of the multi-way valve of FIG. 1 showing the multi-way valve includes a valve housing and a valve flow controller including first and second valve rotors, and further showing the first valve rotor includes a first valve rotor body and a plurality of valve rotor covers coupled to the first valve rotor body;

FIG. 15 is a top view of the multi-way valve of FIG. 14 showing the upper housing body includes more upper housing apertures to increase the number of cooling loops available by rotating the first and second valve rotors; and FIG. 16 is a bottom view of the multi-way valve of FIG. 14 showing the lower housing body includes a plurality of lower housing passageways that are each in fluid communication with one of the upper housing apertures.

DETAILED DESCRIPTION

An illustrative multi-way valve 10 configured to control the flow of fluid to various thermal fluid circuits in a vehicle is shown in FIG. 1. The multi-way valve 10 includes a valve housing 12, a valve flow controller 14, and a sealing system 16. The valve flow controller 14 is arranged in the valve housing 12 to control flow through the valve housing 12. The sealing system 16 is configured to seal between the valve housing 12 and the valve flow controller 14.

The valve flow controller 14 includes a first valve rotor 38 arranged in a first valve cavity 30 formed by the valve housing 12, a second valve rotor 40 arranged in a second valve cavity 32 formed by the valve housing 12, and actuators 28 as shown in FIGS. 1-6. The first valve rotor 38 is configured to rotate relative to the valve housing 12 about a first rotor axis 38A and the second valve rotor 40 is configured to rotate relative to the valve housing 12 about a second rotor axis 40A. The second rotor axis 40A is parallel to the first rotor axis 38A. Each actuator 28 is coupled to one of the valve rotors 38, 40 to drive rotation of the corresponding valve rotor 38, 40.

The first and second valve rotors 38, 40 cooperate to define a plurality of flow paths through the valve housing 12. As the first and second valve rotors 38, 40 are rotated about the respective rotor axes 38A, 40A to different set positions, the first and second valve rotors 38, 40 form different flow paths to control a flow of fluid through the valve housing 12 to different thermal fluid circuits.

The different modes of the multi-way valve 10 are shown in FIG. 7. The first and second valve rotors 38, 40 are in different predetermined positions in each of the different modes A-E to form the different flow paths through the valve housing 12. The multi-way valve 10 and/or each of the actuators 28 may include a control unit that is preprogrammed with the different modes A-E.

The first valve rotor 38 is formed to include a plurality of first rotor through holes 42 that extend axially through the first valve rotor 38 relative to the first rotor axis 38A and are spaced apart circumferentially around the first rotor axis 38A as shown in FIGS. 2-6. The first rotor through holes 42 extend axially through the first valve rotor 38 so that the flow of fluid is able to flow axially through the first valve rotor 38 parallel to the first rotor axis 38A. In this way, the sealing system 16 uses press-fit seals that are each press fit into apertures in the valve housing 12

Other multi-way valves may have more complex passageways through the valve housing, which complicates sealing and increases the pressure drop as the fluid has to make more turns/changes direction more. The complex passageways may increase the potential for leaks across the different passageways. These valves may incorporate seals to seal between the passageways, but adding seals may require the actuator to have an increased torque capability to overcome the friction of the seals between the different components.

Moreover, adding more seals increases the overall manufacturing cost of the multi-way valve. Some valves may use a Teflon material for the seals. This may make manufacturing a multi-way valve expensive, especially as other valves have complex passageways with large, complex seals that may need large amounts of Teflon material.

The multi-way valve 10 of the present disclosure includes first valve rotor 38 with axially extending through holes 42 so that the pressure drop is reduced. Additionally, the seals 75 are press-fit into the upper housing body 20 to engage the axially facing surface 38S of the first valve rotor 38, thereby reducing the contract surface area of the seals 75 with the first valve rotor 38. This not only improves sealing between the holes 42 and the apertures 34A-G in the upper housing body 20 because the flow path is less complicated, but the sealing system 16 also uses less material for the seals and reduces the friction on the first valve rotor 38.

Turning again to the valve housing 12, the valve housing 12 includes a lower housing body 18, an upper housing body 20, and a valve housing cover 22 as shown in FIGS. 1-6. The lower housing body 18 is coupled to a manifold of the thermal fluid circuits. The upper housing body 20 is coupled to the lower housing body 18. The valve housing cover 22 is coupled to the upper housing body 20 to close top openings of the first and second valve cavities 30, 32.

Figure 2:
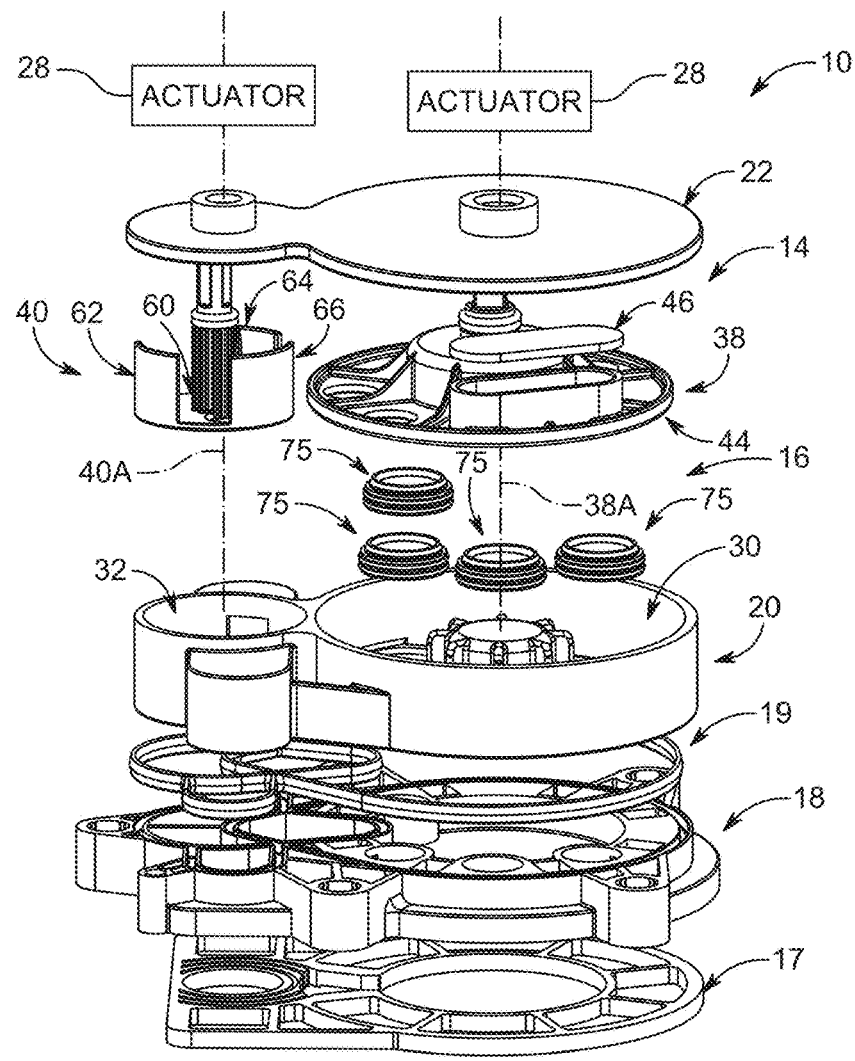
Figure 4:
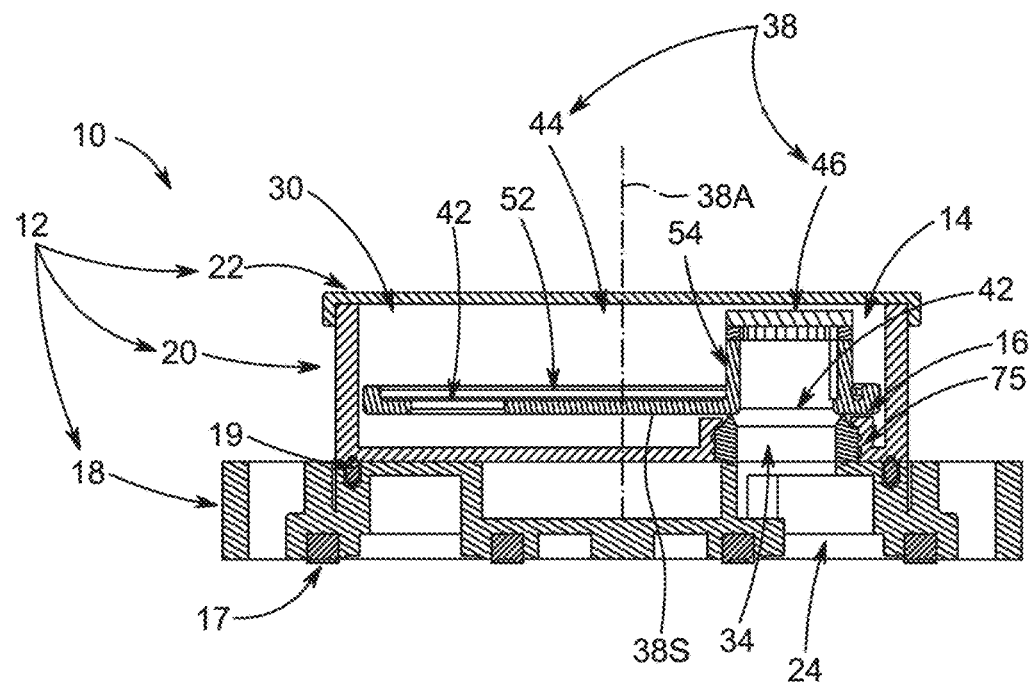
Figure 5:
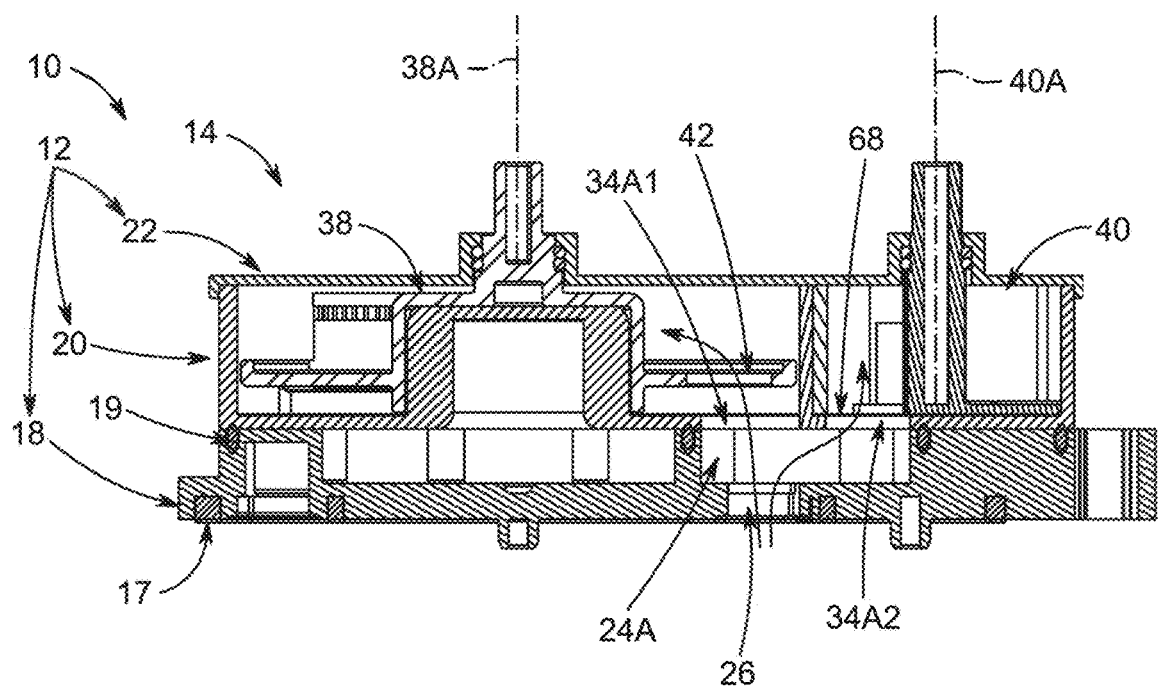
Figure 5A:
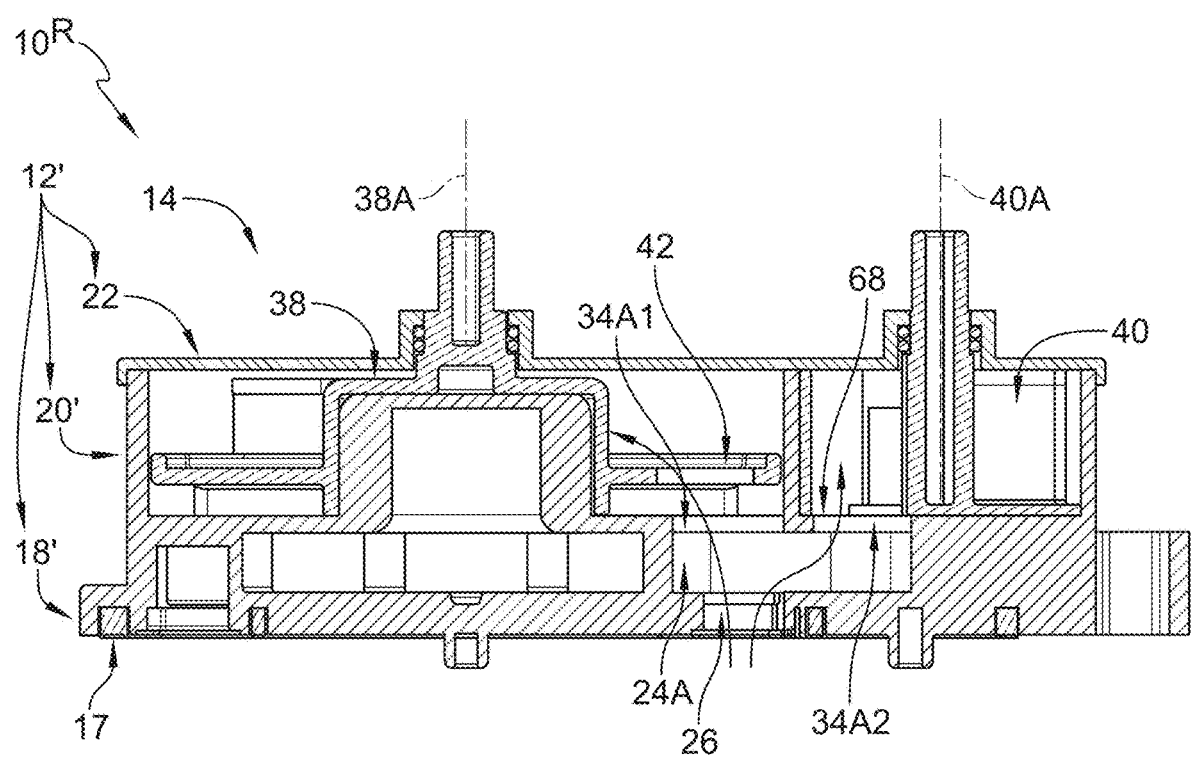

In the illustrative embodiment, the valve housing 12 further includes a manifold gasket 17 and a housing gasket 19 as shown in FIGS. 2, 4, and 5. The manifold gasket 17 is located axially between the manifold and the lower housing body 18. The housing gasket 19 is located axially between the lower housing body 18 and the upper housing body 20 of the valve housing 12. In another embodiment, the valve housing 12' may include a lower housing body 18' and an upper housing body 20' that are formed as a single piece component as shown in FIG. 5A.

Figure 3:
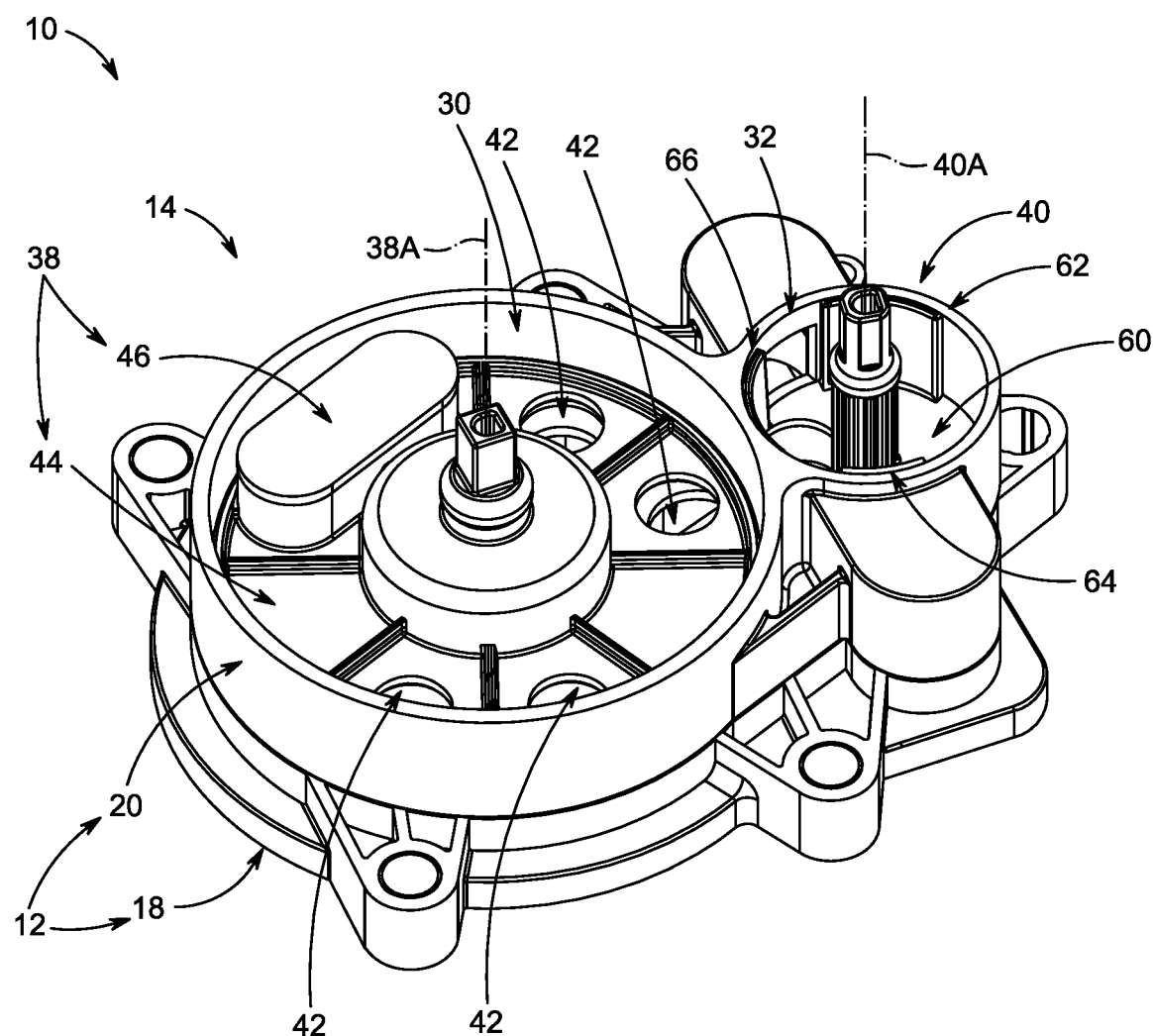

The lower housing body 18 is formed to include a plurality of lower housing passageways 24A-G as shown in FIGS. 2-4. The plurality of lower housing passageways 24A-G are in fluid communication with different thermal fluid circuits. The plurality of lower housing passageways 24A-G are in fluid communication with at least one of the first valve cavity 30 and the second valve cavity 32 of the upper housing body 20 through the corresponding apertures 34A-G. The plurality of lower housing passageways 24A-G includes a connecting passageway 24A that is in fluid communication with both the first and second valve cavities 30, 32.

The connecting passageway 24A of the lower housing body 18 has an inlet opening 26 that opens into the connecting passageway 24A as shown in FIG. 4. The inlet opening 26 opens into the connecting passageway 24A between the first and second valve cavities 30, 32 in the illustrative embodiment.

The upper housing body 20 is shaped to define the first valve cavity 30 and the second valve cavity 32 as shown in FIGS. 2-6. The second valve cavity 32 is in fluid communication with the first valve cavity 30 through the connecting passageway 24A of the lower housing body 18.

The upper housing body 20 is also formed to include a plurality of upper housing apertures 34A-G as shown in FIGS. 2-6. Each upper housing aperture 34A-G of the plurality of upper housing apertures 34A-G is in fluid communication with one passageway 24A-G of the corresponding lower housing passageways 24A-G.

The plurality of upper housing apertures 34A-G includes a first aperture 34A1, a second aperture 34B, a third aperture 34C, a fourth aperture 34D, a fifth aperture 34E, a sixth aperture 34F, a seventh aperture 34G, and an either aperture 34A2 as shown in FIGS. 6 and 7A-E. The first aperture 34A1, the second aperture 34B, the third aperture 34C, the fourth aperture 34D, and the fifth aperture 34E open into the first valve cavity 30. The sixth aperture 34F, the seventh aperture 34G, and the either aperture 34A2 open into the second valve cavity 32. The first and eighth apertures 34A1, 34A2 are in fluid communication with the connecting passageway 24A of the plurality of lower housing passageways 24A-G.

Each of the seals 75 of the sealing system 16 are press-fit into one of the second aperture 34B, the third aperture 34C, the fourth aperture 34D, and the fifth aperture 34E as shown in FIG. 4. Each seal 75 engages an axially facing surface 38S of the first valve rotor 38.

The valve flow controller 14 includes the first valve rotor 38, also referred to as the main valve rotor 38, and the second valve rotor 40, also referred to as the throttle valve rotor 40. The main valve rotor 38 is arranged in the first valve cavity 30 of the upper housing body 20 and the throttle valve rotor 40 is arranged in the second valve cavity 32 of the upper housing body 20. The main valve rotor 38 is configured to rotate relative to the upper housing body 20 about the first rotor axis 38A and the throttle valve rotor 40 is configured to rotate relative to the upper housing body 20 about the second rotor axis 40A.

The first and second valve rotors 38, 40 cooperate to define a plurality of flow paths through the upper housing body 20 and the lower housing body 18. As the first and second valve rotors 38, 40 are rotated about the respective rotor axes 38A, 40A to different set positions, the first and second valve rotors 38, 40 form different flow paths to control the flow of fluid through the upper housing apertures 34A-G of the upper housing body 20 and the lower housing passageways 24A-G of the lower housing body 18.

Figure 6:
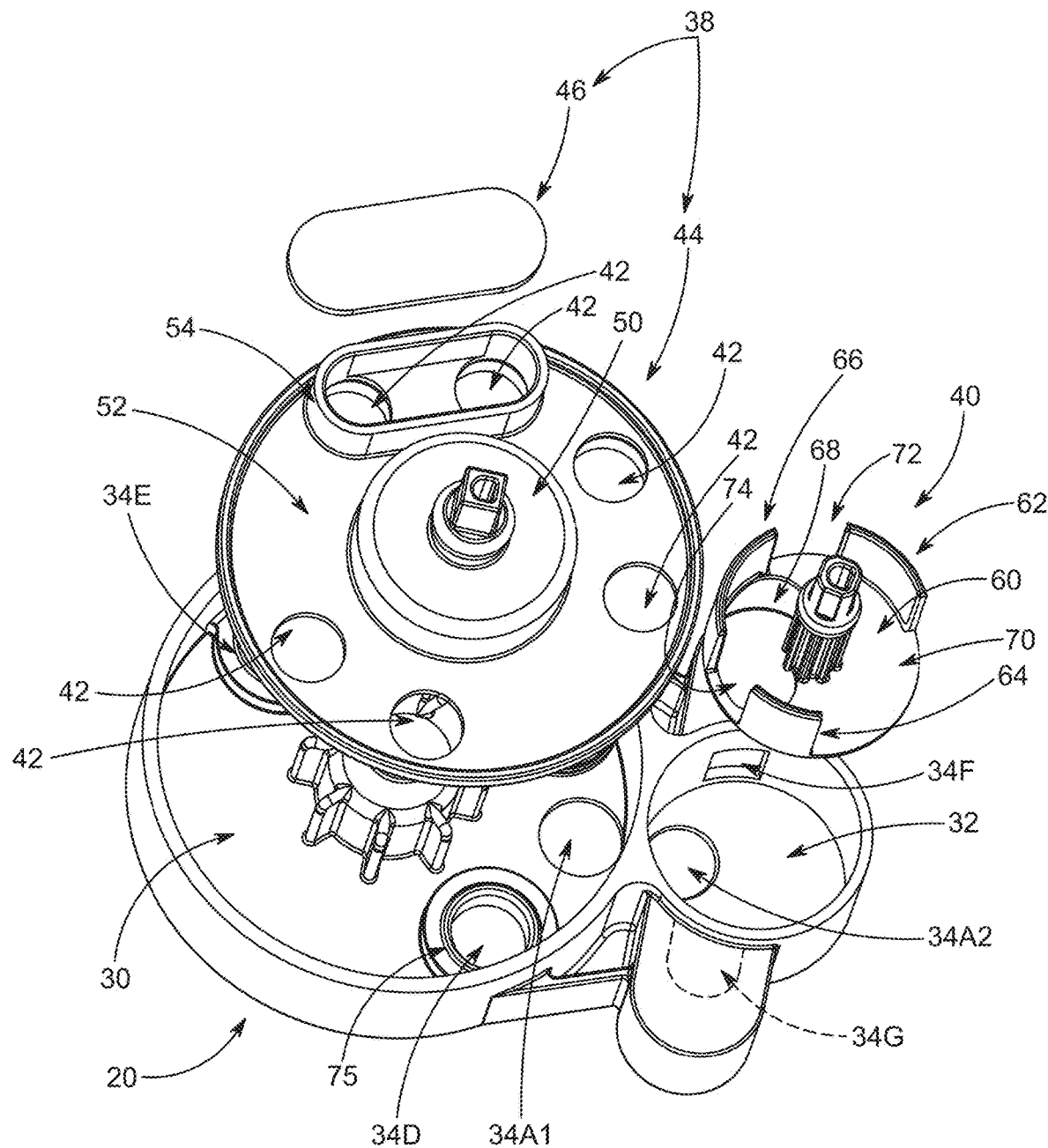
Figure 7A:
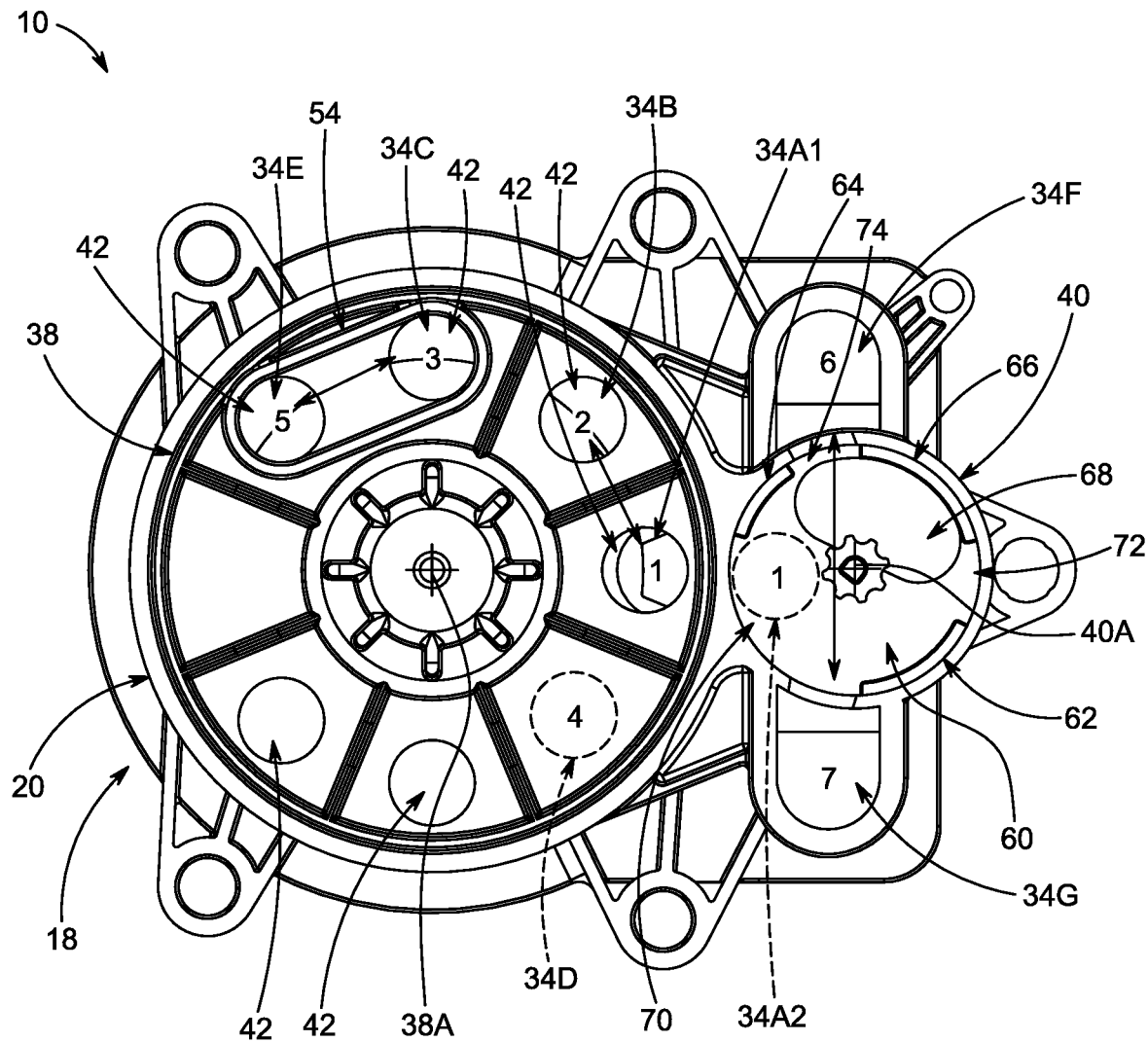
FIG. 7A is a top view of the multi-way valve in mode A as shown in FIG. 7 in which the main valve rotor is in a MAIN VALVE ROTOR FIRST position and the throttle valve rotor 40 is in a THROTTLE VALVE ROTOR FIRST position.
Figure 7B:
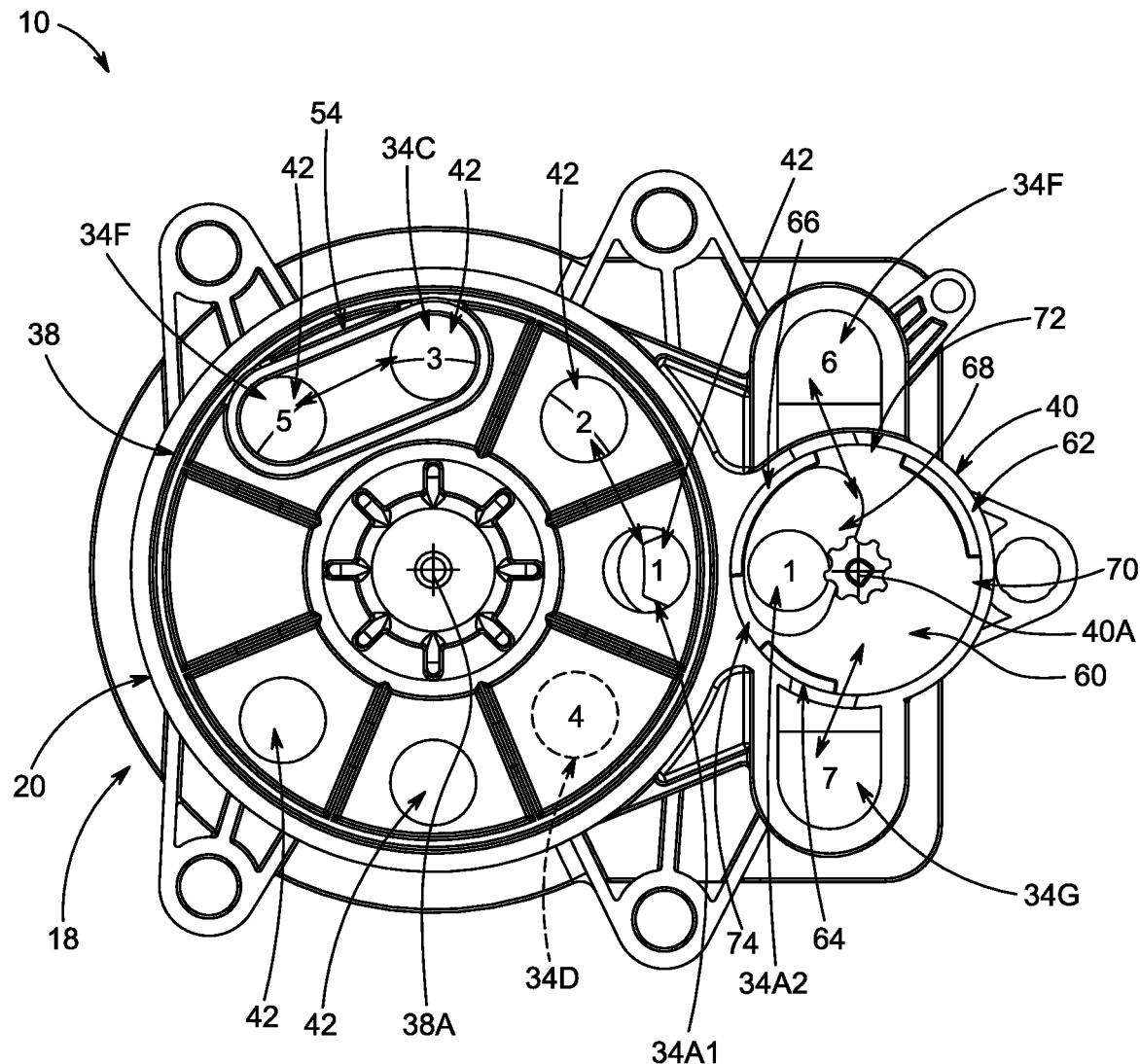
FIG. 7B is a top view of the multi-way valve in mode B as shown in FIG. 7 in which the main valve rotor stays in the MAIN VALVE ROTOR FIRST position, while the throttle valve rotor has moved to a THROTTLE configuration.
Figure 7C:
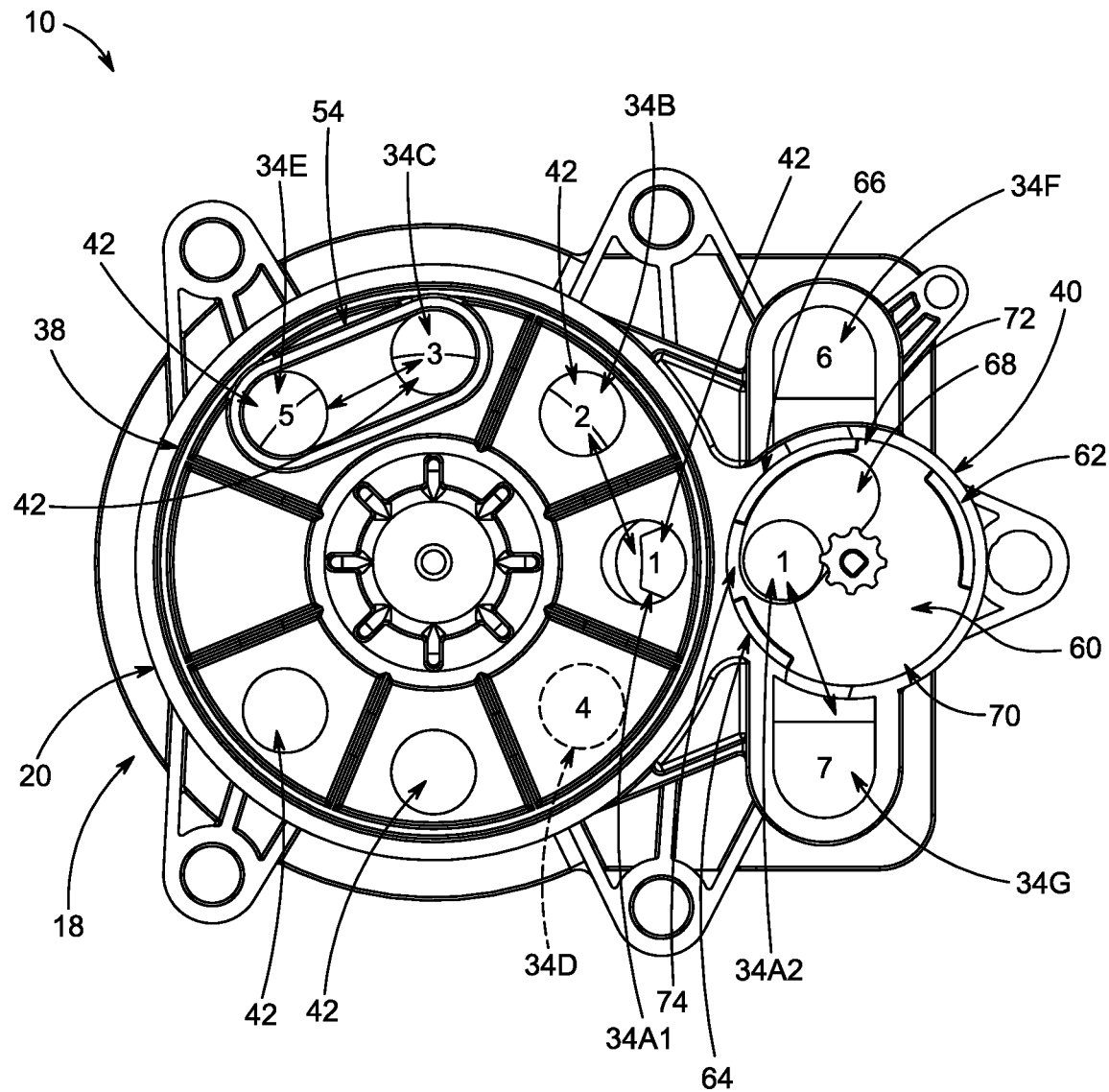
FIG. 7C is a top view of the multi-way valve in mode C as shown in FIG. 7 in which the main valve rotor stays in the MAIN VALVE ROTOR FIRST position and the throttle valve rotor moves to a THROTTLE VALVE ROTOR SECOND position.
Figure 7D:
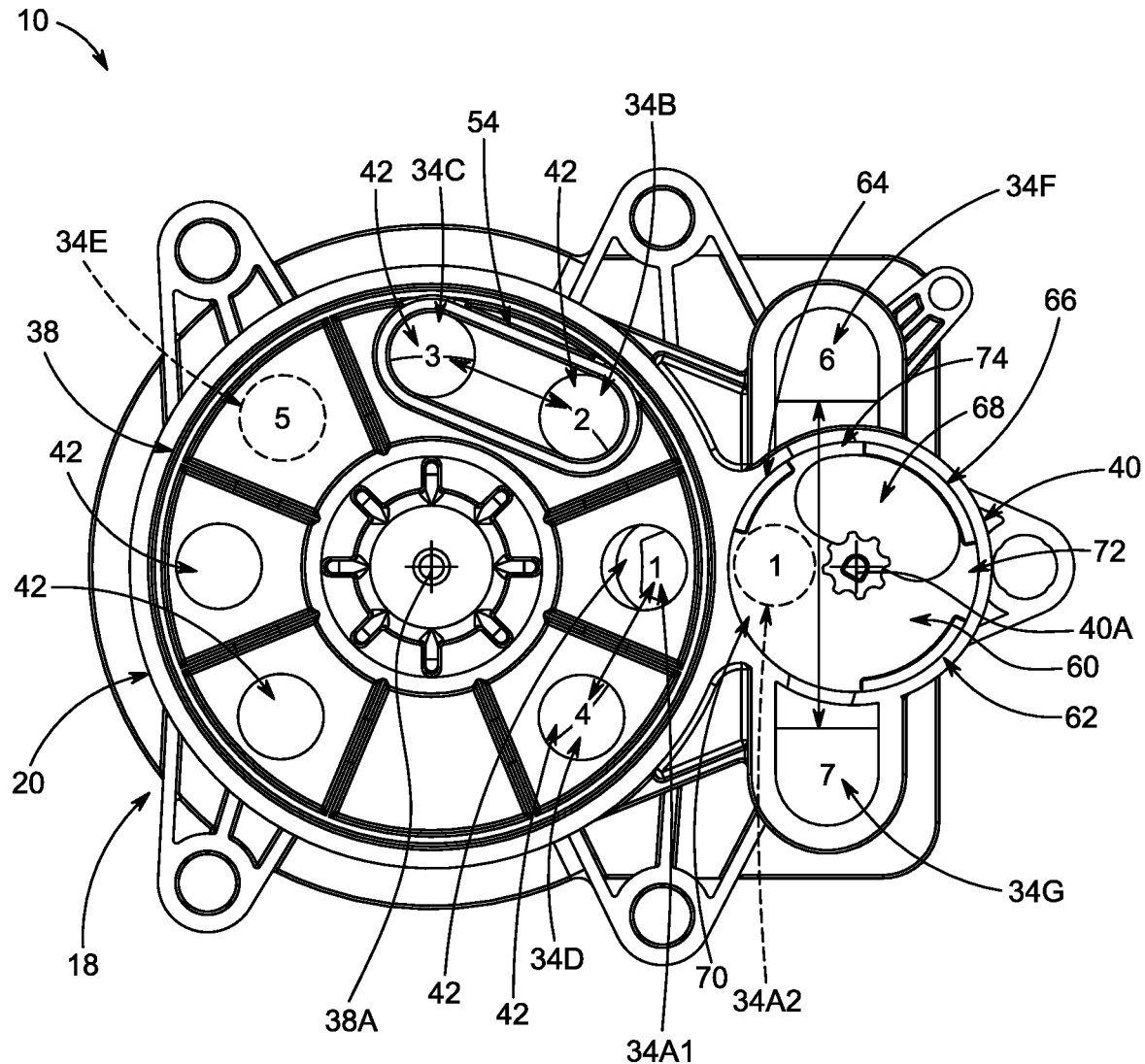
FIG. 7D is a top view of the multi-way valve in mode D as shown in FIG. 7 in which the throttle valve rotor stays in the THROTTLE VALVE ROTOR FIRST position, while the main valve rotor moves to a MAIN VALVE ROTOR SECOND position.
Figure 7E:
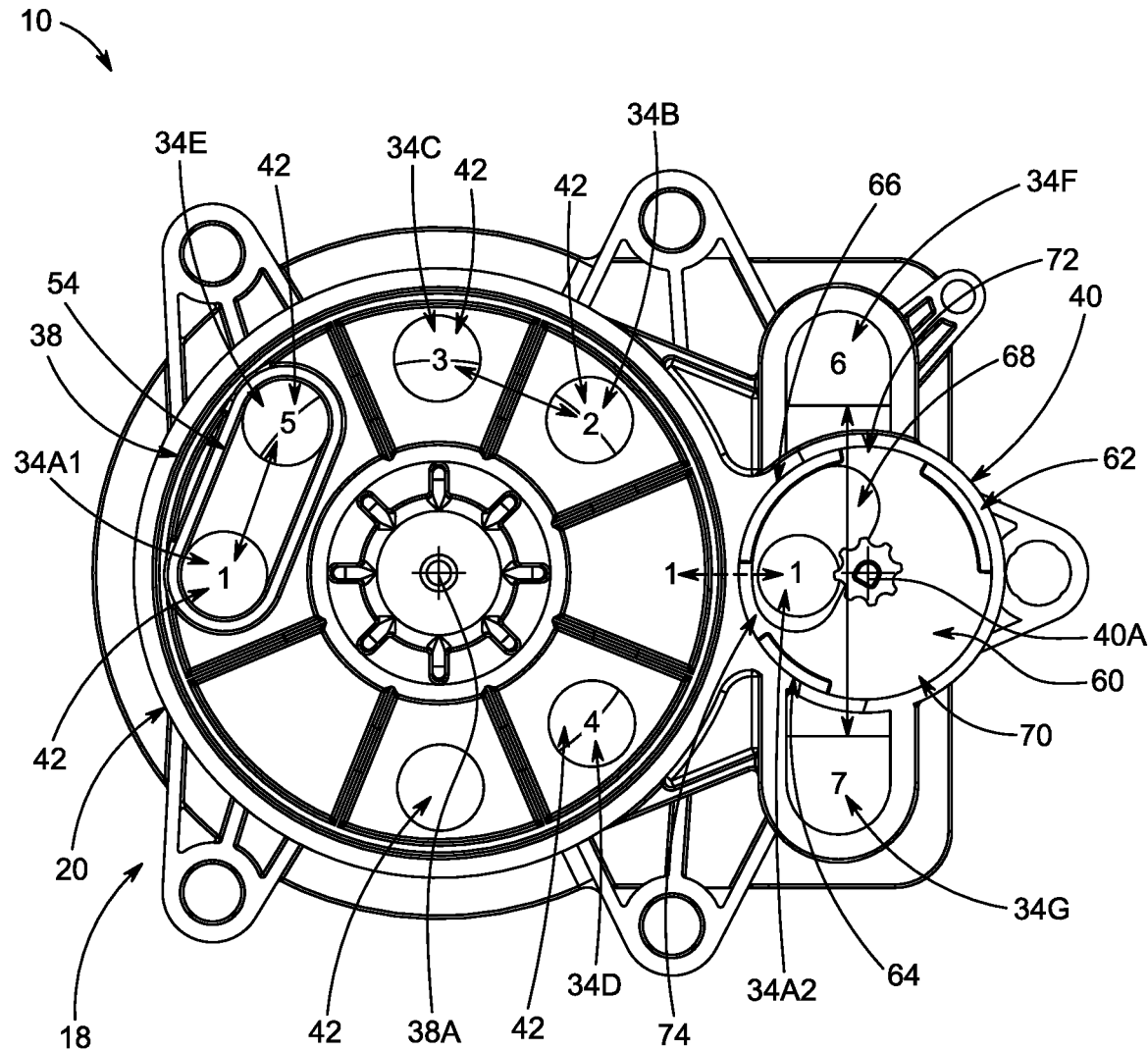
FIG. 7E is a top view of the multi-way valve in mode E as shown in FIG. 7 in which the main valve rotor moves to a MAIN VALVE ROTOR THIRD position, while the throttle valve rotor 40 is in the THROTTLE configuration.
Figure 8:
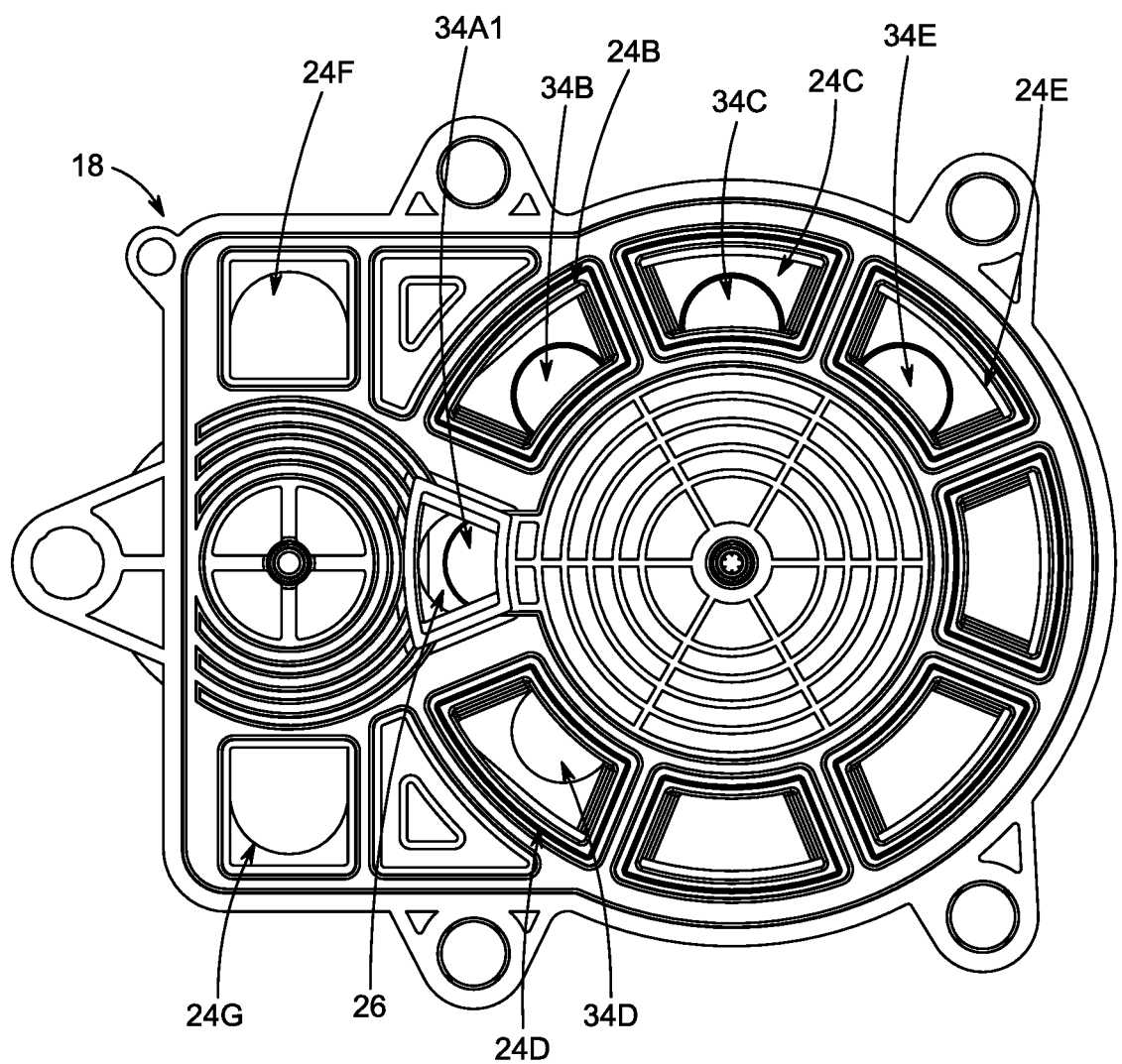
FIG. 8 is a bottom view of the multi-way valve of FIG. 3 showing the lower housing body includes as plurality of lower housing passageways that are in fluid communication with the plurality of upper housing apertures.

The first valve rotor 38 includes a first valve rotor body 44 and at least one valve rotor cover 46 coupled to the first valve rotor body 44 as shown in FIGS. 2-6. The first valve rotor body 44 includes a first valve rotor hub 50, a first valve rotor plate 52, and a first flow divider wall 54 as shown in FIG. 6. The first valve rotor plate 52 extends radially outward from the first valve rotor hub 50 and extends circumferentially around the first valve rotor hub 50 relative to the first rotor axis 38A. The first valve rotor plate 52 is flat or planar. The first rotor through holes 42 extend axially through the first valve rotor plate 52 in the illustrative embodiment. The first flow divider wall 54 extends axially away from the first valve rotor plate 52.

In the illustrative embodiment, the first flow divider wall 54 extends around at least two first rotor through holes 42 of the plurality of first rotor through holes 42 as shown in FIG. 6. The first valve rotor cover 46 couples to the first flow divider wall 54 to block off the two first rotor through holes 42 surrounded by the first rotor flow divider wall 54 from the other through holes 42. The first flow divider wall 54 and the valve rotor cover 46 define a chamber that is separated from the rest of the first valve cavity 30. In this way, the fluid flows directly between the two first rotor through holes 42 surrounded by the first flow divider wall 54 through the chamber.

As the first valve rotor 38 rotates, the first valve rotor plate 52 controls the flow to each aperture 34A1, 34B, 34C, 34D, 34E included in the upper housing apertures 34A-G as shown in FIGS. 7A-7E. The first valve rotor plate 52 controls the flow to each aperture 34A1, 34B, 34C, 34D, 34E by aligning different first rotor through holes 42 with different apertures 34A1, 34B, 34C, 34D, 34E in the different predetermined positions.

In some positions, portions of the first valve rotor plate 52 covers one of the apertures 34A1, 34B, 34C, 34D, 34E to block the flow of fluid therethrough. The first valve rotor plate 52 has dead spots without a through hole 42. In this way, when the first valve rotor 38 is in certain predetermined positions, the first valve rotor plate 52 blocks flow through one of the upper housing apertures 34A-G. Rather, the seal 75 engages the dead spot on the first valve rotor 38 so that the corresponding upper housing aperture 34A-G is covered and blocked.

The second valve rotor 40 includes a second valve rotor plate 60 and a plurality of second valve rotor walls 62, 64, 66 as shown in FIG. 6. The second valve rotor plate 60 is formed to define a second rotor through hole 68 that extends axially through the second valve rotor plate 60 relative to the second rotor axis 40A so that the flow of fluid is able to flow axially through the throttle valve rotor 40 parallel to the second rotor axis 40A. The second rotor through hole 68 extends circumferentially partway about the second rotor axis 40A in the illustrative embodiment. The second valve rotor walls 62, 64, 66 extend axially away from the second valve rotor plate 60. The second valve rotor walls 62, 64, 66 are spaced apart circumferentially to define a plurality of second valve rotor ports 70, 72, 74.

As the throttle valve rotor 40 rotates, the second valve rotor walls 62, 64, 66 vary the amount of fluid flowing through the apertures 34A2, 34F, 34G included in the plurality of upper housing apertures 34A-G. The different valve rotor walls 62, 64, 66 partially open, fully open, or close the apertures 34A2, 34F, 34G in the different predetermined positions to control therethrough. In some positions, a portion of the second valve rotor plate 60 covers the eighth aperture 34A2 to block the flow of fluid therethrough.

The different modes of the multi-way valve 10 are shown in FIG. 7. The first mode or mode A is shown in FIG. 7A. The second mode or mode B is shown in FIG. 7B. The third mode or mode C is shown in FIG. 7C. The fourth mode or mode D is shown in FIG. 7D. The fifth mode or mode E is shown in FIG. 7E.

In mode A, the main valve rotor 38 is in a MAIN VALVE ROTOR FIRST position and the throttle valve rotor 40 is in a THROTTLE VALVE ROTOR FIRST position. In the MAIN VALVE ROTOR FIRST position, the main valve rotor 38 connects the first aperture 34A1 to the second aperture 34B, connects the third aperture 34C and the fifth aperture 34E, and covers the fourth aperture 34D to form the first flow path. The first flow divider wall 54 surrounds the third and fifth apertures 34C, 34E. In the THROTTLE VALVE ROTOR FIRST position, the throttle valve rotor 40 covers the eight aperture 34A2 to block flow from the connecting passageway 24A and connects the sixth aperture 34F and the seventh aperture 34G.

In mode B, the main valve rotor 38 stays in the MAIN VALVE ROTOR FIRST position, while the throttle valve rotor 40 moves to a THROTTLE configuration. In the THROTTLE configuration, the throttle valve rotor 40 has rotated to uncover the eight aperture 34A2 to allow flow from the connecting passageway 24A through the eighth aperture 34A2. However, in the THROTTLE configuration, the throttle valve rotor 40 can rotate about the second rotor axis 40A to vary, or throttle, the flow through the sixth and seventh apertures 34F, G.

In mode C, the main valve rotor 38 stays in the MAIN VALVE ROTOR FIRST position and the throttle valve rotor 40 moves to a THROTTLE VALVE ROTOR SECOND position. In the THROTTLE VALVE ROTOR SECOND position, the hole 68 is aligned with the eighth aperture 34A2 such that one of the second valve rotor wall 66 covers the sixth aperture 34F of the upper housing body 20 to block flow therethrough. In this way, the eight aperture 34A2 is connected to the seventh aperture 34G In mode D, the throttle valve rotor 40 stays in the THROTTLE VALVE ROTOR FIRST position, while the main valve rotor 38 moves to a MAIN VALVE ROTOR SECOND position. In the MAIN VALVE ROTOR SECOND position, the main valve rotor 38 has rotated to connect the second aperture 34B and the third aperture 34C, to connect the first aperture 34A1 and the fourth aperture 34D, to cover the fifth aperture 34E. The second and third apertures 34B, 34C are surrounded by the first flow divider wall 54.

In mode E, the main valve rotor 38 moves to a MAIN VALVE ROTOR THIRD position, while the throttle valve rotor 40 is in the THROTTLE configuration. In the MAIN VALVE ROTOR THIRD position, the main valve rotor 38 has rotated to connect all the apertures 34A-G.

The multi-way valve 10 and/or each of the actuators 28 may include the control unit configured to direct the actuators 28 to move each of the valve rotors 38, 40 to the different predetermined positions in each of the different modes A-E. Based on where the vehicle needs fluid, the control unit would direct the actuators 28 to move each of the valve rotors 38, 40 to one of the positions for the desired mode.

Another embodiment of a multi-way valve 210 in accordance with the present disclosure is shown in FIGS. 9-13. The multi-way valve 210 is substantially similar to the multi-way valve 10 shown in FIGS. 1-8 and described herein. Accordingly, similar reference numbers in the 200 series indicate features that are common between the multi-way valve 10 and the multi-way valve 210. The description of the multi-way valve 10 is incorporated by reference to apply to the multi-way valve 210, except in instances when it conflicts with the specific description and the drawings of the multi-way valve 210.

The multi-way valve 210 includes a valve housing 212, a valve flow controller 214, and a sealing system 216 as shown in FIGS. 9-11. The valve flow controller 214 is arranged in the valve housing 212 to control flow through the valve housing 212. The valve flow controller 214 includes first and second valve rotors 238, 240. The sealing system 216 is configured to seal between the valve housing 212 and the valve flow controller 214.

The sealing system 216 includes the press-fit seals 276 and a biasing assembly 274 as shown in FIGS. 9 and 10. The press-fit seals are each press fit into a corresponding upper housing aperture formed in the upper housing body 220 of the valve housing 212 and engage an axially facing surface 238S of the first valve rotor 238. The biasing assembly 274 is configured to selectively apply an axial force F on the first valve rotor 238 to urge the first valve rotor 238 into engagement with the plurality of seals when the first valve rotor 238 is in one of the different predetermined positions in each of the modes A-E to improve sealing between the first valve rotor 238 and the upper housing body 220.

The biasing assembly 274 selectively applies the axial force F to increase friction between the first valve rotor 238 and the seals at the different predetermined positions, but removes the axial force when the first valve rotor 238 rotates to reduce the friction between the first valve rotor 238 and the seals. In this way, the torque needed to rotate the first valve rotor 238 is reduced and the wear on the seals is reduced. The seals are made of a Teflon material in the illustrative embodiment. In other embodiments, the seals may be made of another suitable material.

In other multi-way seals, large amounts of Teflon material may be used to seal the different passages, which can make manufacturing the multi-way valve expensive. Therefore, by reducing the amount of friction on the seals during rotation of the first valve rotor 238, wear on the seals is reduced. This reduces the need to replace the seals as well and reduces the cost of repairing the multi-way valve 210.

The biasing assembly 274 includes cam ramps 276 formed on an axially facing 222S surface of the housing cover 222 of the valve housing 212 and a cam surface 278 formed on the first valve rotor 238 as shown in FIGS. 9-13. The cam ramps 276 are equally spaced apart circumferentially about the first rotor axis 238A. The cam surface 278 is configured to engage the cam ramps 276 on the housing cover 222 as the first valve rotor 238 rotates about the first rotor axis 238A to the plurality of different predetermined positions.

The cam surface 278 is formed on an axially facing surface 250S of the first valve rotor hub 250 as shown in FIGS. 10-12. The cam surface 278 is raised at 45-degree intervals around the first rotor axis 238A.

The cam ramps 276 on the housing cover 222 are each circumferentially aligned with one upper housing aperture 234A1, 234B, 234C, 234D, 234E formed in the upper housing body 220 of the valve housing 212. In this way, the raised portions 278P of the cam surface 278 engages one of the cam ramps 276 in each of the different predetermined positions to cause the axial force F to be applied to the first valve rotor 238. Then as the first valve rotor 238 rotates about the first rotor axis 238A, the raised portions 278P of the cam surface 278 disengage the cam ramps 276 so that the axial force F is removed and the torque needed to rotate the first valve rotor 238 is reduced.

The cam ramps 276 are fixed on the housing cover 222. The cam surface 278 on the first valve rotor 238 rides against the cam ramps 276 in a circular manner and applies downward axial force F to the first valve rotor 238 when aligned with the high point 278P of the cam surface 278. This force F generates a contact pressure between the underside of the first valve rotor 238 and the elastomer seal press-fit into the upper housing body 220. The increased contact pressure and resulting increase in friction are only generated when the through hole 242 is aligned with the seal. This reduces friction and torque on the actuator during movement between seal points.

Another embodiment of a multi-way valve 310 in accordance with the present disclosure is shown in FIGS. 14-16. The multi-way valve 310 is substantially similar to the multi-way valve 10 shown in FIGS. 1-8 and described herein. Accordingly, similar reference numbers in the 300 series indicate features that are common between the multi-way valve 10 and the multi-way valve 310. The description of the multi-way valve 10 is incorporated by reference to apply to the multi-way valve 310, except in instances when it conflicts with the specific description and the drawings of the multi-way valve 310.

The multi-way valve 310 includes a valve housing 312, a valve flow controller 314, and a sealing system 316 as shown in FIGS. 14-16. The valve flow controller 314 is arranged in the valve housing 312 to control flow through the valve housing 312. The sealing system 316 is configured to seal between the valve housing 312 and the valve flow controller 314.

Compared to the valve housing 12 of FIGS. 1-9, the valve housing 312 has a greater number of upper housing apertures 334A-K than the valve housing 12. In this way, the multi-way valve 310 is configured to control the flow through more thermal fluid circuits.

The lower housing body 318 of the valve housing 312 is formed to include a plurality of lower housing passageways 324A-K as shown in FIG. 16. The plurality of lower housing passageways 324A-K are in fluid communication with different thermal fluid circuits. The plurality of lower housing passageways 324A-K are in fluid communication with at least one of a first valve cavity 330 and a second valve cavity 332 of the upper housing body 220 through the corresponding apertures 334A-G.

The upper housing body 320 is also formed to include a plurality of upper housing apertures 334A-K as shown in FIG. 15. Each aperture 334A-K of the plurality of upper housing apertures 334A-K is in fluid communication with one passageway 324A-K of the corresponding lower housing passageways 324A-K.

Each of the seals 375 of the sealing system 316 are press-fit into one of the apertures 334A1, 334B, 334C, 334D, 334E, 334F, 334G, 334H as shown in FIG. 15. Each seal engages an axially facing surface of the first valve rotor 338.

The valve flow controller 314 includes the first valve rotor 338, also referred to as the main valve rotor 38, and the second valve rotor 340, also referred to as the throttle valve rotor 340. The main valve rotor 338 is arranged in the first valve cavity 330 of the upper housing body 320 and the throttle valve rotor 340 is arranged in the second valve cavity 332 of the upper housing body 20. The main valve rotor 338 is configured to rotate relative to the upper housing body 320 about the first rotor axis 338A and the throttle valve rotor 340 is configured to rotate relative to the upper housing body 20 about the second rotor axis 340A.

The first and second valve rotors 338, 340 cooperate to define a plurality of flow paths through the upper housing body 320 and the lower housing body 318 much like the first and second valve rotors 38, 40 in FIGS. 1-9. However, there are more possible modes since there are a greater number of upper housing apertures 334A-K. As the first and second valve rotors 338, 340 are rotated about the respective rotor axes 38A, 40A to different set positions, the first and second valve rotors 338, 340 form different flow paths to control the flow of fluid through valve housing 312.

The first valve rotor 338 includes a first valve rotor body 344 and three valve rotor covers 346, 347, 348 as shown in FIG. 14. Each of the valve rotor covers 346, 347, 348 are coupled to the first valve rotor body 344.

The first valve rotor body 344 includes a first valve rotor hub 350, a first valve rotor plate 352, and three flow divider walls 354, 356, 358 as shown in FIG. 14. The first valve rotor plate 352 extends radially outward from the first valve rotor hub 350 and extends circumferentially around the first valve rotor hub 350 relative to the first rotor axis 338A. The first rotor through holes 342 extend axially through the first valve rotor plate 352 in the illustrative embodiment. Each of the flow divider walls 354, 356, 358 extends axially away from the first valve rotor plate 352.

In the illustrative embodiment, each of the flow divider walls 354, 356, 358 extends around at least two first rotor through holes 342 of the plurality of first rotor through holes 342 as suggested in FIG. 14. The first valve rotor cover 346 couples to the first flow divider wall 354, the second valve rotor cover 347 couples to the second flow divider wall 356, and the third valve rotor cover 348 couples to the third flow divider wall 358.

The invention claimed is:

1. A multi-way valve comprising
a valve housing including a lower housing body coupled to a manifold of thermal fluid circuits, an upper housing body coupled to the lower housing body and shaped to define a first valve cavity and a second valve cavity in fluid communication with the first valve cavity through the lower housing body, and a housing cover coupled to the upper housing body to close top openings of the first and second valve cavities, the lower housing body formed to include a plurality of lower housing passageways, and the first and second valve cavities of the upper housing body are in fluid communication with the plurality of lower housing passageways, and
a valve flow controller including a first valve rotor arranged in the first valve cavity of the upper housing body and configured to rotate relative to the upper housing body about a first rotor axis and a second valve rotor arranged in the second valve cavity of the upper housing body and configured to rotate relative to the upper housing body about a second rotor axis that is parallel to the first rotor axis, the first and second valve rotors cooperate to define a plurality of flow paths when the first and second valves are rotated about the respective rotor axes to a plurality of different predetermined positions to control a flow of fluid through the upper housing body and the lower housing body,
wherein the first valve rotor is formed to include a plurality of first rotor through holes that extend axially through the first valve rotor relative to the first rotor axis so that the flow of fluid is able to flow axially through the first valve rotor parallel to the first rotor axis.

2. The multi-way valve of claim 1, wherein the first valve rotor includes a first valve rotor body and at least one valve rotor cover coupled to the first valve rotor body.

3. The multi-way valve of claim 2, wherein the first valve rotor body includes a first valve rotor hub, a first valve rotor plate that extends radially outward from the first valve rotor hub and circumferentially around the first valve rotor hub relative to the first rotor axis, and a first flow divider wall that extends axially away from the first valve rotor plate, the first flow divider wall extends around at least two first rotor through holes of the plurality of first rotor through holes, and the first valve rotor cover couples to the first flow divider wall to close a top opening formed by the first flow divider wall.

4. The multi-way valve of claim 3, wherein the first valve rotor body further includes a second flow divider wall that extends that extends axially away from the first valve rotor plate, the second flow divider wall extends around at least two first rotor through holes of the plurality of first rotor through holes, and the first valve rotor further includes another valve rotor cover coupled to the second flow divider wall to close a top opening formed by the second flow divider wall.

5. The multi-way valve of claim 4, wherein the first valve rotor body further includes a third flow divider wall that extends that extends axially away from the first valve rotor plate, the third flow divider wall extends around at least two first rotor through holes of the plurality of first rotor through holes, and the first valve rotor further includes another valve rotor cover coupled to the third flow divider wall to close a top opening formed by the third flow divider wall.

6. The multi-way valve of claim 3, wherein the second rotor valve includes a second valve rotor plate and a plurality of second valve rotor walls that extend axially away from the second valve rotor plate and spaced apart circumferentially to define a plurality of second valve ports, and wherein the second valve rotor plate is formed to include a second rotor through hole that extends axially through the second valve rotor relative to the second rotor axis so that the flow of fluid is able to flow axially through the second valve rotor parallel to the second rotor axis.

7. The multi-way valve of claim 1, further comprising a sealing system including a plurality of seals that are each press fit into a corresponding upper housing aperture formed in the upper housing body of the valve housing and engage an axially facing surface of the first valve rotor.

8. The multi-way valve of claim 7, wherein the sealing system further includes biasing means for applying an axial force on the first valve rotor to urge the first valve rotor into engagement with the plurality of seals when the first valve rotor is in one of the plurality of different predetermined positions to improve sealing between the first valve rotor and the upper housing body and for removing the axial force on the first valve rotor to reduce friction between the first valve rotor and the plurality of seals when the first valve rotor is rotated about the first rotor axis from one position to another position included in the plurality of different predetermined positions.

9. The multi-way valve of claim 8, wherein the biasing means includes cam ramps on an axially facing surface of the housing cover of the upper housing body and a cam surface on the first valve rotor configured to engage the cam ramps on the housing cover as the first valve rotor rotates about the first rotor axis to the plurality of different predetermined positions.

10. The multi-way valve of claim 9, wherein the cam surface is raised at 45-degree intervals around the first rotor axis and the cam ramps on the housing cover are each aligned with one upper housing aperture formed in the upper housing body of the valve housing.

11. The multi-way valve of claim 7, wherein the sealing system further includes a biasing assembly configured to selectively apply an axial force on the first valve rotor to urge the first rotor into engagement with the plurality of seals when the first valve rotor is in one of the plurality of different predetermined positions to improve sealing between the first valve rotor and the upper housing body.

12. The multi-way valve of claim 11, wherein the biasing assembly includes cam ramps on an axially facing surface of the housing cover of the valve housing and a cam surface on the first valve rotor configured to engage the cam ramps on the upper housing cover as the first valve rotor rotates about the first rotor axis to the plurality of different predetermined positions.

13. The multi-way valve of claim 12, wherein the cam surface is raised at 45-degree intervals around the first rotor axis and the cam ramps on the upper housing cover are each aligned with one upper housing aperture formed in the upper housing body of the valve housing.

14. The multi-way valve of claim 1, wherein the lower housing body forms a connecting passageway with end openings that align with one port in the upper housing body that opens into the first valve cavity and another port in the upper housing body that opens into the second valve cavity so that the first and second valve cavities are in fluid communication.

15. The multi-way valve of claim 14, wherein the lower housing body has an inlet opening that opens into the connecting passageway between the first and second valve cavities.

16. The multi-way valve of claim 15, wherein the upper housing body and the lower housing body are formed as a single piece component.

17. The multi-way valve of claim 14, wherein the valve housing further includes a housing gasket located axially between the lower housing body and the upper housing body of the valve housing.

18. A multi-way valve comprising
a valve housing including a lower housing body, an upper housing body coupled to the lower housing body and shaped to define a first valve cavity and a second valve cavity in fluid communication with the first valve cavity, and a housing cover coupled to the upper housing body to close top openings of the first and second valve cavities,
a valve flow controller including a first valve rotor arranged in the first valve cavity of the upper housing body and configured to rotate relative to the upper housing body about a first rotor axis and a second valve rotor arranged in the second valve cavity of the upper housing body and configured to rotate relative to the upper housing body about a second rotor axis that is parallel to the first rotor axis, the first and second valve rotors cooperate to define a plurality of flow paths when the first and second valves are rotated about the respective rotor axes to a plurality of different predetermined positions to control a flow of fluid through the upper housing body and the lower housing body, and
a sealing system including a plurality of seals that are each press fit into a corresponding upper housing aperture formed in the upper housing body of the valve housing and engage an axially facing surface of the first valve rotor and a biasing assembly configured to selectively apply an axial force on the first valve rotor to urge the first rotor into engagement with the plurality of seals when the first valve rotor is in one of the plurality of different predetermined positions to improve sealing between the first valve rotor and the upper housing body.

19. The multi-way valve of claim 18, wherein the biasing assembly includes cam ramps on an axially facing surface of the housing cover of the valve housing and a cam surface on the first valve rotor configured to engage the cam ramps on the upper housing cover as the first valve rotor rotates about the first rotor axis to the plurality of different predetermined positions.

20. The multi-way valve of claim 19, wherein the cam surface is raised at 45-degree intervals around the first rotor axis and the cam ramps on the upper housing cover are each aligned with one housing aperture formed in the upper housing body of the valve housing.

21. The multi-way valve of claim 18, wherein the first valve rotor is formed to include a plurality of first rotor through holes that extend axially through the first valve rotor relative to the first rotor axis so that the flow of fluid is able to flow axially through the first valve rotor parallel to the first rotor axis.

22. The multi-way valve of claim 21, wherein the first valve rotor includes a first valve rotor body and at least one valve rotor cover coupled to the first valve rotor body.

23. The multi-way valve of claim 22, wherein the first valve rotor body includes a first valve rotor hub, a first valve rotor plate that extends radially outward from the first valve rotor hub and circumferentially around the first valve rotor hub relative to the first rotor axis, and a first flow divider wall that extends axially away from the first valve rotor plate, the first flow divider wall extends around at least two first rotor through holes of the plurality of first rotor through holes, and the first valve rotor cover couples to the first flow divider wall to close a top opening of the first flow divider wall.

24. The multi-way valve of claim 23, wherein the first valve rotor body further includes a second flow divider wall that extends that extends axially away from the first valve rotor plate, the second flow divider wall extends around at least two first rotor through holes of the plurality of first rotor through holes, and the first valve rotor further includes another valve rotor cover coupled to the second flow divider wall to close a top opening of the second flow divider wall.

25. The multi-way valve of claim 21, wherein the second rotor valve includes a second valve rotor plate and a plurality of second valve rotor walls that extend axially away from the second valve rotor plate and spaced apart circumferentially to define a plurality of second valve ports, and wherein the second valve rotor plate is formed to include a second rotor through hole that extends axially through the second valve rotor relative to the second rotor axis so that the flow of fluid is able to flow axially through the second valve rotor parallel to the second rotor axis.

* * * * *